United States Patent

Kato et al.

[11] Patent Number: 5,497,170
[45] Date of Patent: Mar. 5, 1996

[54] HEADUP DISPLAY APPARATUS

[75] Inventors: Masayuki Kato; Hirokazu Aritake; Tsuyoshi Matsumoto; Junji Tomita; Fumio Yamagishi; Masato Nakashima, all of Kanagawa; Masao Suzuki, Shizuoka; Toshiaki Fujiwara, Shizuoka; Masaya Sugita, Shizuoka; Koichi Takoa, Shizuoka, all of Japan

[73] Assignees: Yazaki Corporation, Tokyo; Fujitsu Limited, Kawasaki, both of Japan

[21] Appl. No.: 353,304

[22] Filed: Dec. 5, 1994

Related U.S. Application Data

[63] Continuation of Ser. No. 73,630, Jun. 8, 1993, abandoned, which is a continuation of Ser. No. 760,037, Sep. 13, 1991, abandoned.

[30] Foreign Application Priority Data

| Sep. 20, 1990 | [JP] | Japan | 2-98770 U |
| Sep. 20, 1990 | [JP] | Japan | 2-248921 |
| Sep. 20, 1990 | [JP] | Japan | 2-248922 |
| Sep. 21, 1990 | [JP] | Japan | 2-253558 |
| Nov. 6, 1990 | [JP] | Japan | 2-298991 |
| Nov. 6, 1990 | [JP] | Japan | 2-298992 |

[51] Int. Cl.$^6$ ........................... G09G 3/02
[52] U.S. Cl. .................. 345/9; 345/8; 340/980
[58] Field of Search ............... 345/7, 8, 9, 10; 359/13, 632, 630; 353/13, 14; 340/980

[56] References Cited

U.S. PATENT DOCUMENTS

| 3,848,974 | 11/1974 | Hosking et al. | 353/14 |
| 3,915,548 | 10/1975 | Opittek et al. | 345/7 |
| 4,763,990 | 8/1988 | Wood | 350/320 |
| 4,832,427 | 5/1989 | Nanba et al. | 350/3.27 |
| 4,886,328 | 12/1989 | Iino | 340/705 |
| 4,923,771 | 5/1990 | Cosner | 340/705 |
| 4,925,272 | 5/1990 | Ohshima et al. | 340/705 |
| 4,927,234 | 5/1990 | Banbury et al. | 340/705 |
| 4,962,998 | 10/1990 | Iino | 340/705 |
| 4,986,631 | 1/1991 | Aoki et al. | 359/438 |
| 5,028,119 | 7/1991 | Hegg et al. | 340/980 |
| 5,070,323 | 12/1991 | Iino et al. | 340/705 |

FOREIGN PATENT DOCUMENTS

| 0344810 | 12/1989 | European Pat. Off. |
| 1574351 | 9/1980 | United Kingdom |

*Primary Examiner*—Tommy P. Chin
*Assistant Examiner*—Gin Goon
*Attorney, Agent, or Firm*—Armstrong, Westerman, Hattori, McLeland & Naughton

[57] ABSTRACT

A headup display apparatus consists of a projection optical system unit installed in the dashboard of a car and a reflection member on the windshield. The projection optical system unit contains an indicator and an off-axis reflective hologram which reflects display light of the indicator toward the windshield, which in turn reflects it toward the viewing point of a driver. As a result, the display is seen superimposed on the exterior view. When external light as from the sun enters the projection optical system unit traveling in a direction reverse to the path of the display light, the off-axis reflective hologram reflects the incident external light toward a direction different from that of the outgoing display light to minimize an abnormal illumination of the indicator surface which would otherwise render the display unrecognizable. Behind the hologram is installed a heat dissipating member that receives infrared rays that have transmitted the hologram in order to dissipate heat.

17 Claims, 28 Drawing Sheets

LIGHT SPECTRUM OF INDICATOR

REFLECTION WAVELENGTH
BAND OF OFF-AXIS
REFLECTIVE HOLOGRAM

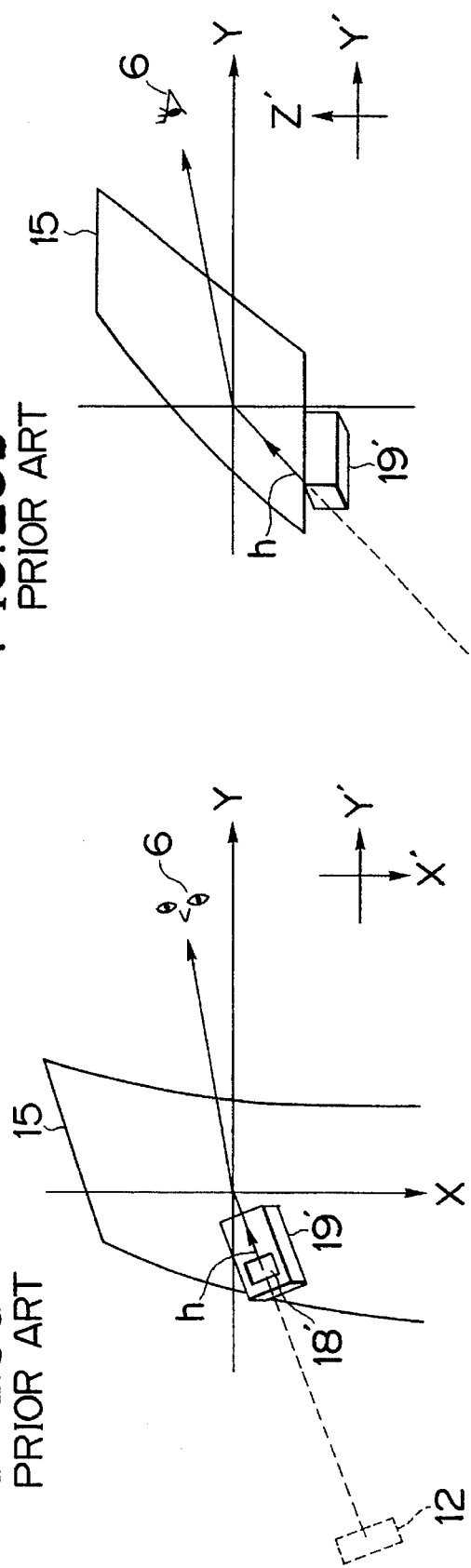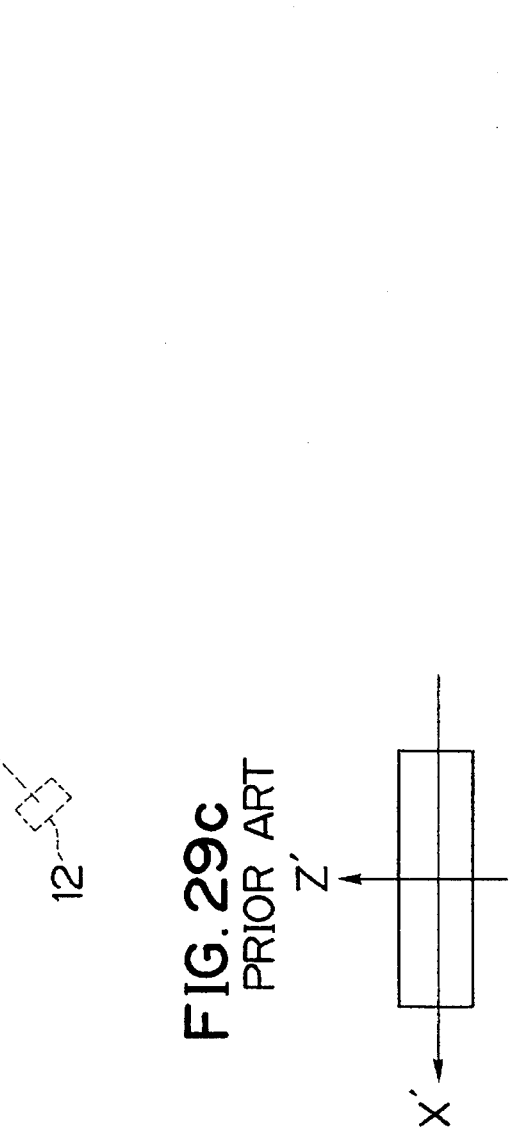
FIG.29b PRIOR ART
FIG.29c PRIOR ART
FIG.29a PRIOR ART

FIG. 38
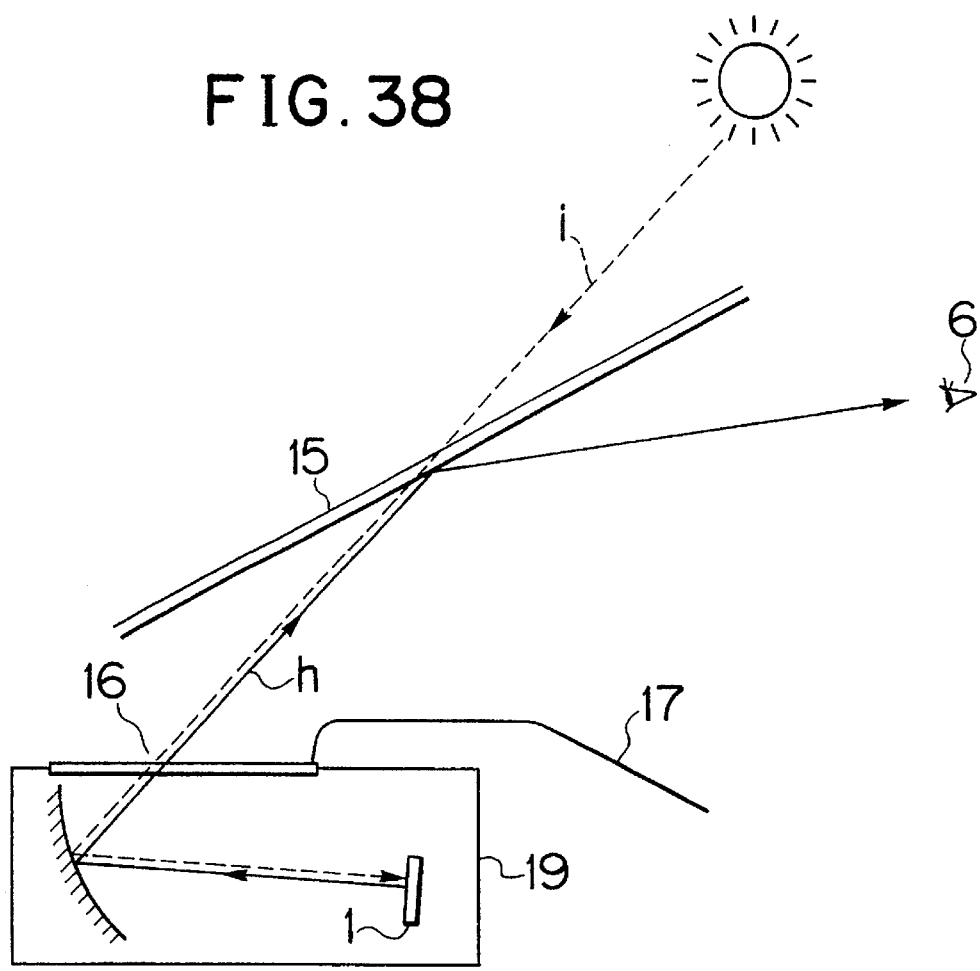
FIG.39a  FIG.39b
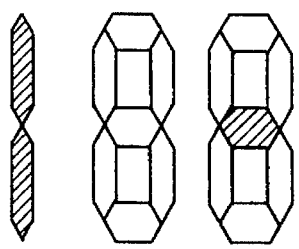
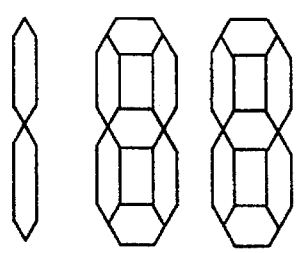

HEADUP DISPLAY APPARATUS

This application is a continuation of application Ser. No. 08/073,630 filed Jun. 8, 1993, now abandoned, which was a continuation of application Ser. No. 07/760,037 filed Sep. 13, 1991, now abandoned.

BACKGROUND OF THE INVENTION

1. Field of the Invention

The present invention relates to a headup display apparatus and, more particularly, to a headup display apparatus in which display light is projected toward the windshield so that a driver can see a display image reflected according to the shape of the windshield. It is designed to prevent a phenomenon in which external light as from the sun travels through the path of the display light in a reverse direction to illuminate the surface of an indicator, making the display unrecognizable. The headup display is constructed in such a way that the display light radiated from the indicator is reflected by an off-axis reflecting member, such as hologram and prism, onto the windshield which, in turn, reflects the incoming display light toward the viewing point of the driver.

The present invention relates to a headup display apparatus and, more specifically, to a headup display apparatus which projects the display light onto the windshield which, according to the shape of its surface, reflects the display light toward the driver so that he or she can see it.

2. Description of the Related Art

In general, the headup display superimposes an image information on a background view, allowing a person to see a great deal of information simultaneously without requiring large body motions or large shifting of line of sight on the part of the driver. Because of this advantage, the headup display has already been put into practical use with cockpits of fighter and commercial aircraft. In recent years, the use of the headup display in automobiles has been considered.

In applying the headup display apparatus to automobiles, there are three types of combiners available for transmitting the background light and reflecting the display light. The first type employs a reflection type hologram formed integral with the windshield. As shown in FIG. 37a, a projection optical system unit 19 including an indicator is mounted in a dashboard 17 and the display light h from the unit is reflected by the reflection type hologram 5 formed on the windshield 15 to direct the light toward the viewing point 6 of a driver. The second type has a separate hologram combiner 5' installed on the dashboard. As shown in FIG. 37b, the projection optical system unit 19 including the indicator is installed inside the dashboard 17. The display light h is reflected by a hologram combiner 5' toward the viewing point 6 of the driver. The third type uses as the combiner a windshield not formed with a hologram or a windshield treated to increase the reflection factor. As shown in FIG. 37c, the projection optical system unit 19 including the indicator is mounted in the dashboard 17 and the display light h is reflected by the windshield 15 toward the viewing point 6 of the driver.

The first type requires making the reflective hologram in the manufacturing process of the windshield, and this increases the cost. Another disadvantage is that, when viewed from outside the car, the hologram reflects external rays of light and looks colored, marring the image of a high-class product.

The second type has some design problems in that the outline of the combiner exists in the viewing field in the windshield and that a structural member is placed on the dashboard.

On the other hand, the third type, though it has a problem of low display light utilization, has the advantage of low manufacturing cost. It is superior in design to other types and therefore is most promising for automotive applications.

FIG. 38 shows the action of the third type of combiner mentioned above. When sun light i travels along the light path of the display light h in the reverse direction and enters the projection optical system unit 19 from an opening 16 in the dashboard 17, it illuminates the indicator 1 which, when it uses a fluorescent light indicator tube, strongly disperses light because of a white color of the fluorescent substance, resulting in a phenomenon in which the display segments seem to light up regardless of whether the display is actually turned on or off, making the correct display impossible. FIG. 39 shows the condition of abnormal illumination. FIG. 39a represents a correct display condition indicating a number "80." The shaded part of the display segments is not lighted. FIG. 39b shows an abnormal illuminating condition in which the entire surface of the display segments is struck by a strong light (sun rays) which is scattered by the white fluorescent substance, making the display segments look as if they are emitting light. When the intensity of the scattered light is strong as compared with the display light (the sun rays in a clear day have sufficient intensity), it is difficult to distinguish between the correct and the abnormal display. The fluorescent display tube has a high level of luminance as compared with other types of indicators and is inexpensive, making it the most promising device as an indicator of the headup display. Under these situations, there has been a call for solution of the abnormal illumination of the fluorescent display tube.

SUMMARY OF THE INVENTION

This invention has been accomplished in light of the above problems experienced with the conventional displays and its object is to provide a headup display in which external light as from the sun, when it enters the indicator unit, does not cause abnormal lighting of the display surface of an indicator such as a fluorescent indicator tube.

The headup display apparatus of this invention that eliminates the above drawbacks comprises: an illumination type indicator that emits display light in a visible wavelength range; an off-axis reflection member which reflects the display light from the indicator in a predetermined direction, said off-axis reflection member having a reflection surface that reflects incident external light coming in a direction reverse to the path of the display light toward a direction different from that of the visible display light of the indicator; and a reflection member arranged in a viewing field of a driver, said reflection member having an appropriate reflection factor and an appropriate transmission factor, said reflection member reflecting the display light from the off-axis reflection member toward the eye position of the driver so that a virtual image of the display formed by the display light reflected by the reflection member is superimposed on an exterior view seen through the reflection member.

In the headup display apparatus of this invention, the indicator produces display light in a visible range of the wavelength spectrum, and the off-axis reflection member reflects the display light from the indicator in a predetermined direction so that the reflected display light is further reflected by another reflection member toward the viewing point of a driver.

The off-axis reflection member reflects external incident light—which enters the apparatus by traveling, along the path of the reflected display light in the reverse direction—toward a direction different from that of the visible light of the indicator. Therefore, the intensity of the external incident light that is reflected toward the indicator is mitigated by the off-axis reflection member.

BRIEF DESCRIPTION OF THE DRAWINGS

FIGS. 29a, 29b and 29c are diagrams showing a conventional method of correcting the image rotation;

FIG. 38 and FIGS. 39a and 39b are schematic diagrams showing the problems that the invention is intended to solve.

DETAILED DESCRIPTION OF THE PREFERRED EMBODIMENT

Figure 1:
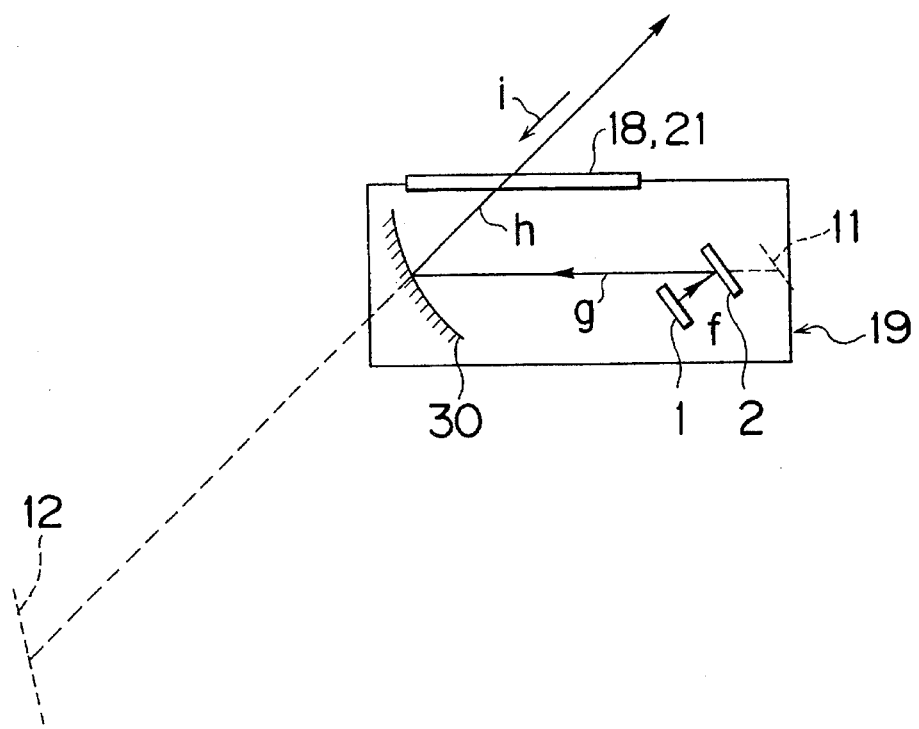
FIG. 1 is a schematic diagram showing an essential part of a first embodiment of the invention.

Embodiments of this invention will be described in detail by referring to the attached drawings. To facilitate understanding of operation, identical parts are given like reference numerals throughout the figures, and repetition of explanation of these identical parts is avoided.

FIG. 1 shows an essential portion of a first embodiment of the invention. The first, second to ninth, and fourteenth embodiments employ an off-axis reflective hologram as an off-axis reflection member.

In FIG. 1, reference numeral 1 represents an indicator (fluorescent indicator tube) for displaying the speed of a car and readings of other meters. Designated 2 is an off-axis reflective hologram designed to reflect light f emitted from the indicator 1 in a direction such that the reflection angle differs from the incident angle. The angle of incidence and the angle of reflection are defined as angles formed by the incident beam and the reflected beam with respect to a normal line of the hologram 2 on the side of the indicator 1. The light g reflected by a hologram layer on the off-axis reflective hologram forms a virtual image 11 and is then reflected by a concave mirror 30 as an enlargement optical system, thus forming an enlarged virtual image 12 at a remote position. The light h reflected by the concave mirror 30 passes through a window 18, which is used to enclose the projection optical system unit 19, and goes out of the unit.

Figure 2:
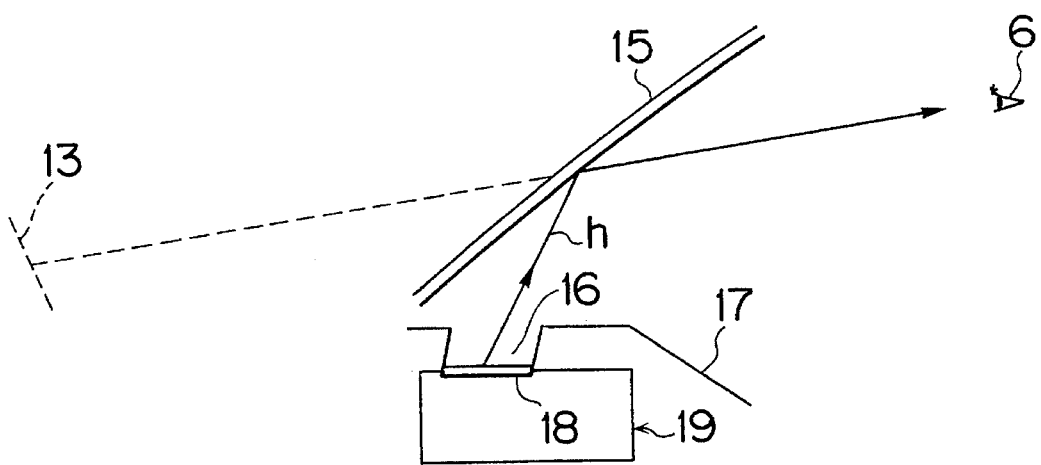
FIG. 2 is a schematic diagram showing one example of a projection optical system unit of the invention mounted in a car.

FIG. 2 shows the projection optical system unit 19 of this invention installed in a car. The projection optical system unit 19 is installed inside the dashboard 17, which is formed with an opening 16 to allow the display light to go out of the unit. The angle of projection of the display light h from the projection optical system unit 19 is so determined that the display light h from the unit 19 is partly reflected by the windshield 15 toward the viewing position 6 of a driver. The windshield 15 (a plate member whose reflection factor and transmission factor are set at specified values) may be given no treatment at its reflection surface so that the boundary surface between the glass and the air functions as a reflection surface, or it may be coated with a thin metal film, a dielectric multiple layer or a regular reflection type hologram film to increase the reflection factor. In this way, the driver can see the display image at a position of the virtual image 13 within a viewing field on the windshield.

Figure 3:
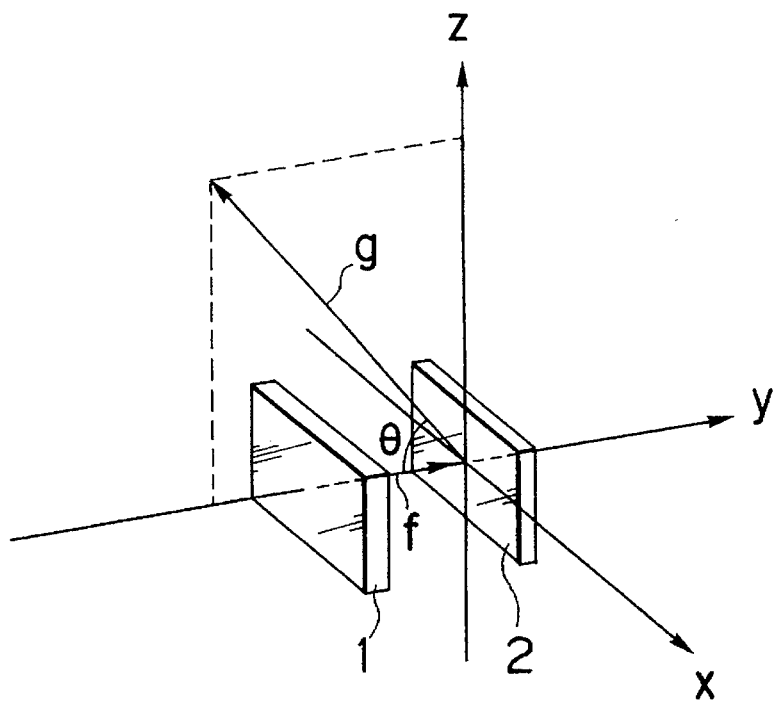
FIG. 3 is a diagram showing the indicator and the off-axis reflective hologram used in the embodiment and their relationship with the direction of the propagation of the display light.

FIG. 3 is a perspective view showing the indicator 1 in the projection optical system unit 19 and the off-axis reflective hologram 2. The off-axis reflective hologram 2 reflects an incident display light f, which strikes the hologram 2 nearly vertically, in a direction of arrow g with a large reflection angle θ (for example 45 degrees).

Now, one example process of manufacturing the off-axis reflective hologram will be described by referring to FIG. 12.

A hologram dry plate X and the focus of a first diverging lens 100 are located at positions corresponding to the off-axis reflective hologram 2 and the display surface of the indicator. A light axis $l_{100}$ of the first diverging lens 100 has an incident angle θ' with the hologram dry plate X equal to an angle at which the display light f is to be incident on the off-axis reflective hologram 2. A light axis $l_{200}$ of a second diverging lens 200 has an incident angle θ with the hologram dry plate X equal to an angle at which the display light is to be reflected from the off-axis reflective hologram 2.

A laser beam from a laser generator 300 is split in two directions by a beam splitter 400. The split laser beams are led along the light axis of the first diverging lens 100 and the second diverging lens 200 through mirrors 500 and 600, respectively.

The laser beams with spherical wave front from the first and second diverging lenses 100, 200 are radiated against the front and back of the hologram dry plate X to record a Lippmann type hologram consisting of interference fringes stacked in layers in the direction of emulsion layer thickness on the dry plate X. Then the dry plate X is developed to form the off-axis reflective hologram 2.

Figure 4A:
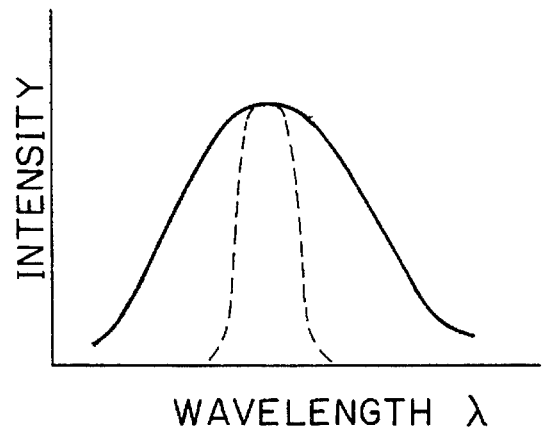
FIGS. 4a and 4b are diagrams showing characteristics of the indicator and the off-axis reflective hologram.
Figure 4B:
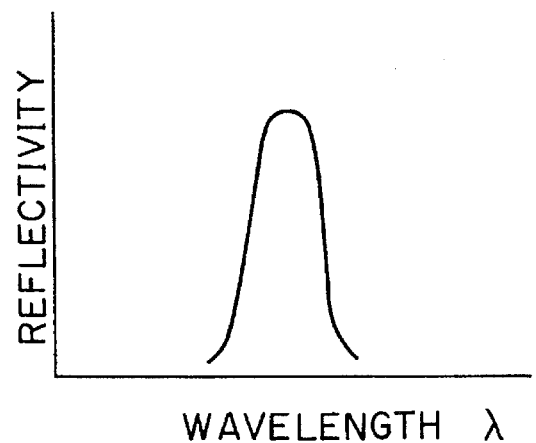

The wavelength band of the reflected light from the off-axis reflective hologram 2 is set close to a peak value in the light spectrum of the indicator 1, as shown in FIG. 4. The effective area of the off-axis reflective hologram 2 is made almost equal to or somewhat greater than the display area of the indicator 1. The precise area required is determined by the size of an element making up the enlargement optical system (in this case, the concave mirror 30) and by the range of driver's viewing point (or viewing range) through which the driver can see the display. So the exact area of the off-axis reflective hologram depends on the design.

In this embodiment constructed as described above, when in FIG. 1 the sun light i enters the projection optical system unit 19 traveling the same path of the display light h but in the reverse direction and strikes the off-axis reflective hologram 2, a part of the sun light is regularly reflected by the cover glass surface of the hologram. The light of other than the reflection wavelength band of the hologram layer passes through the hologram, while only the light of the reflection wavelength band of the hologram layer reaches the indicator 1. Thus, abnormal illumination of indicator 1 can be greatly reduced. Although the external light of the reflection wavelength band of the hologram 2 enters the indicator 1, the intensity of abnormal illumination of the indicator 1 is weak compared with the display light f and thus raises no practical problem.

Figure 5:
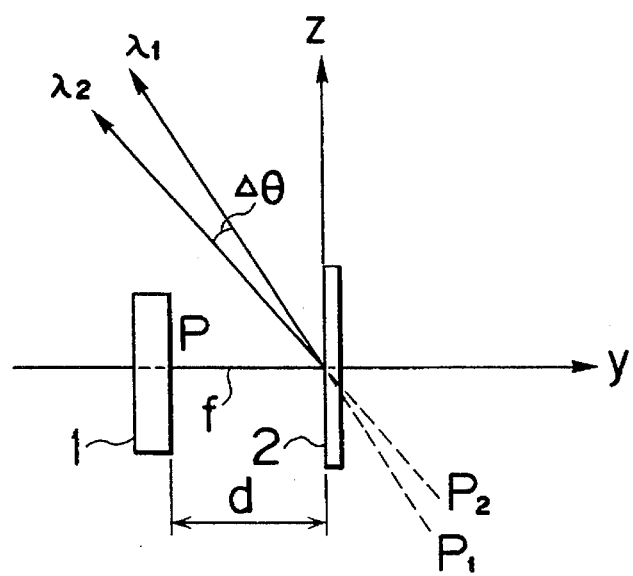
FIG. 5 is a diagram illustrating that the chromatic aberration of the off-axis reflective hologram in the embodiment is negligible.

FIG. 5 illustrates that the chromatic aberration produced by the off-axis reflective hologram 2 can be made virtually negligible by putting the hologram close to the indicator 1. From each point on the indicator surface, light disperses spherically, but here we represent the light by a center beam. The light originating from a point P on the indicator surface and reflected by the off-axis reflective hologram 2 has a variety of wavelength components. Of these wavelengths the maximum and minimum wavelengths are chosen and taken to be $\lambda_1$, $\lambda_2$. The light reflected by the off-axis reflective hologram is reflected in different directions according to the wavelength, so that the virtual image is formed at different positions $P_1$, $P_2$ according to the wavelength.

A virtual image formed by the light with wavelength between $\lambda_1$ and $\lambda_2$ is formed at a position between the points $P_1$ and $P_2$. This means that the point P, which was originally one point, becomes blurred over the line whose ends are $P_1$ and $P_2$. This phenomenon is the chromatic aberration. The degree of fuzziness depends largely on the distance d between the indicator 1 and the off-axis reflective hologram 2. The range of variation in the direction of reflection Δθ becomes fixed once the wavelengths are determined, but the distance between the points $P_1$ and $P_2$ can be reduced by reducing the interval d. Considering that the wavelength selection range of the off-axis reflective hologram is between 20 and 30 nm, the blur of the image can virtually be made negligible by setting the interval d smaller than 20 mm.

Figure 6:
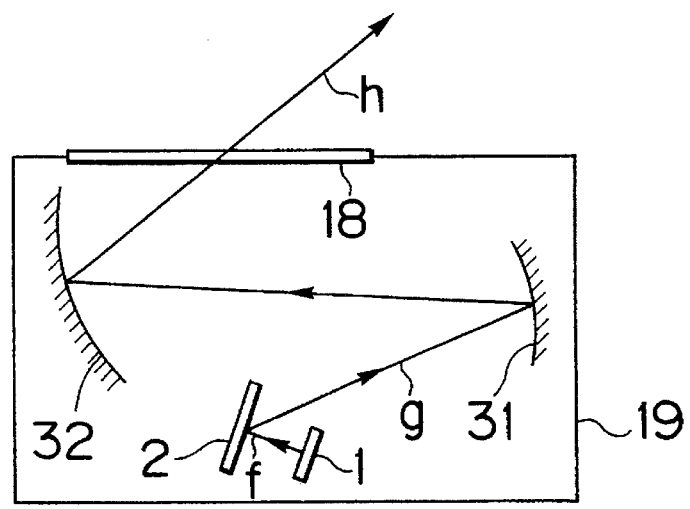
FIG. 6 is a schematic diagram showing an essential part of a second embodiment of the invention.

FIG. 6 shows an essential part of the second embodiment of this invention. This embodiment uses two concave mirrors 31, 32 as an enlargement optical system to increase the magnification factor of the display. One method of increasing the magnifying factor is to use a concave mirror 30 in FIG. 1 with a short focal distance. But this mirror will produce an increased distortion of the image, making it difficult to secure a wide viewing range. To explain in more concrete terms, when the viewing position or eye position of the driver changes, the image the driver sees will become greatly distorted. The use of two concave mirrors with relatively long focal length permits an increase in the magnifying power for the image without severe distortion.

This embodiment with the above construction has the advantage of significantly reducing the abnormal illumination from sun light that enters along the same path of the display light in the reverse direction, as in the first embodiment. Furthermore, it is capable of reducing the level of image distortion from the level of the first embodiment.

While in FIG. 6 the light axes are placed on a plane, the outgoing direction of the display light h can be changed to any arbitrary direction.

Figure 7:
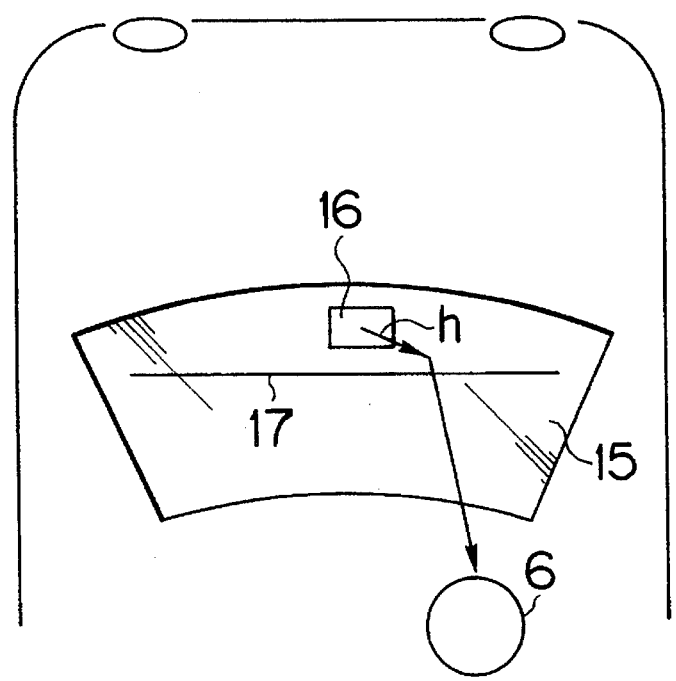
FIG. 7 is a schematic diagram showing another example of the projection optical system unit of the invention mounted in a car.

Generally, the driver's seat is provided either on the right or left side of a car. Thus, how the display light h is reflected by the windshield 15 is not so simple as can be drawn on a plan view. That is, as shown in FIG. 7, the display light h coming out of the opening 16 of the dashboard 17 must be reflected sideways at an angle toward the viewing position 6 of the driver.

Figure 8A:
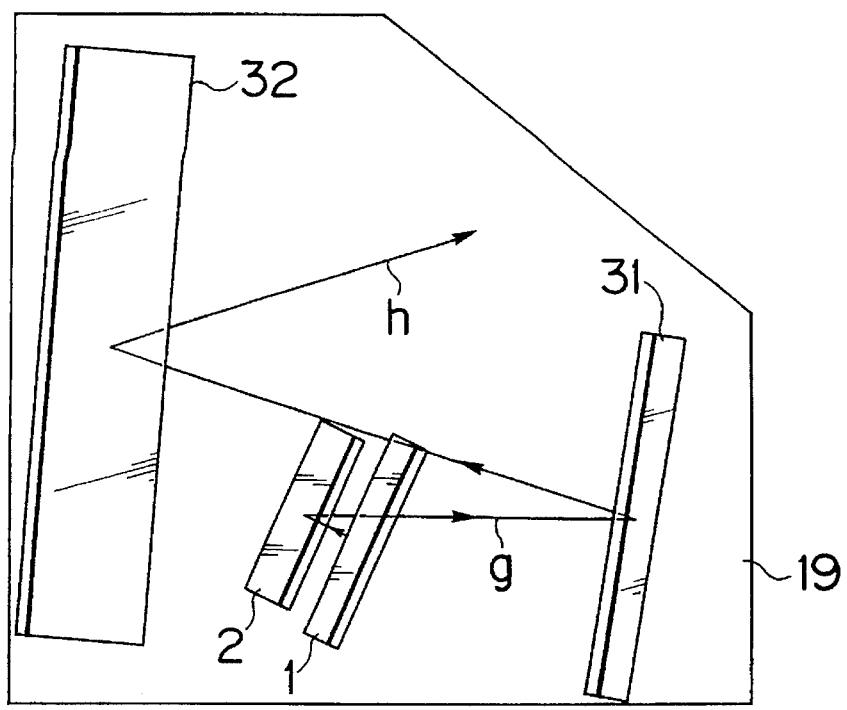
FIGS. 8a and 8b are schematic diagrams showing a variation of the second embodiment.
Figure 8B:
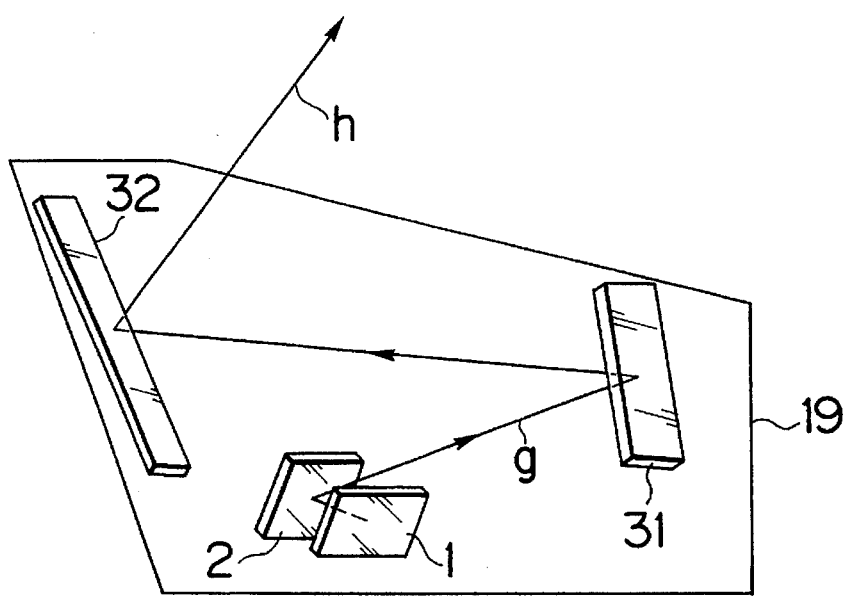
Figure 9:
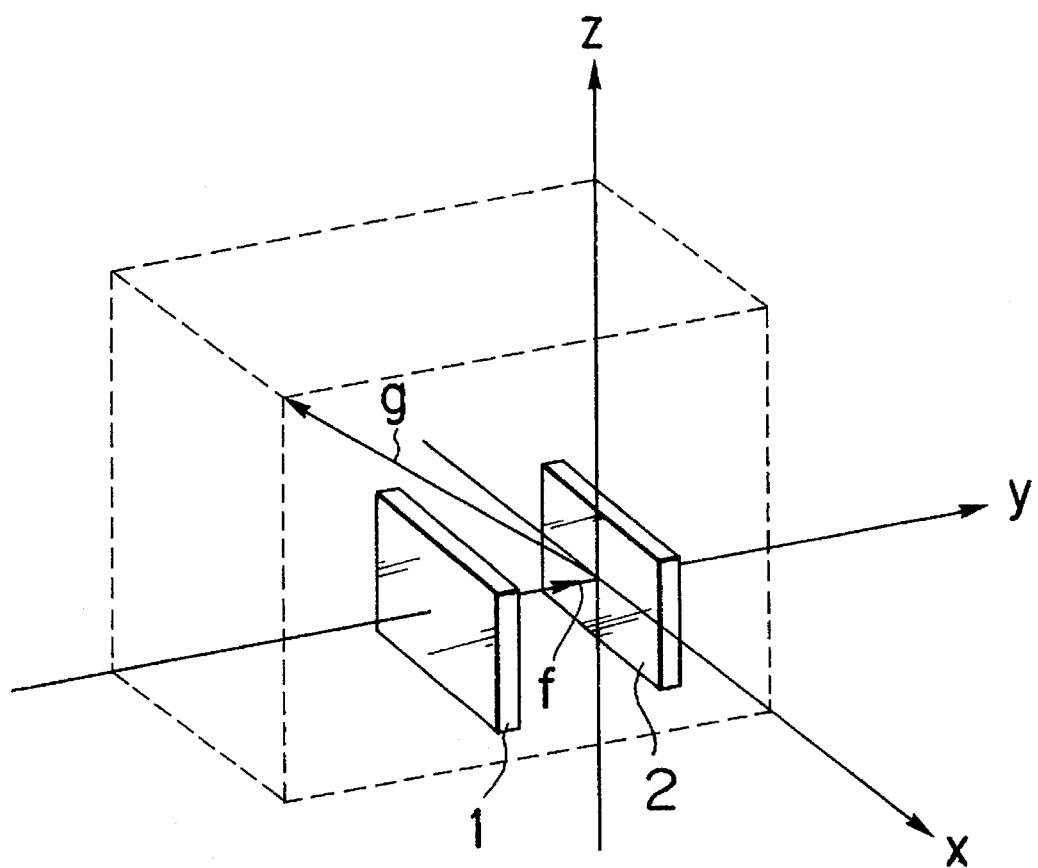
FIG. 9 is a diagram showing the indicator and the off-axis reflective hologram used in the variation of the second embodiment and their relationship with the direction of propagation of the display light.

FIG. 8 is a variation of the second embodiment, showing one example of the projection optical system unit 19 that is applicable in the situation described above. FIG. 8a is a plan view and FIG. 8b is a side view. While constitutional elements are the same as those of FIG. 6, i.e., the indicator 1, off-axis reflective hologram 2 and concave mirrors 31, 32, they are arranged in a different manner and the light is reflected in a different direction by the off-axis reflective hologram. In FIG. 8b, the relative position of the indicator 1 and the off-axis reflective hologram 2 is almost the same as that in FIG. 6. However, the direction in which the light is reflected is set inclined sideways. FIG. 9 shows the positional relationship between the indicator 1 and the off-axis reflective hologram 2. The display light f incident almost vertical on the hologram surface is reflected diagonally as indicated by line g. The process of making the hologram is the same as in the case of FIG. 3, but the hologram dry plate must be rotated in a plane during installation so that the light is reflected diagonally. It is also noted that the indicator 1, the off-axis reflective hologram 2 and the concave mirror system are all distorted in their positional relationship. Further, the positional relationship between the two concave mirrors 31 and 32 is not symmetrical, so that the display light h, after being reflected by the windshield 15, produces a horizontal character display within an appropriate viewing field. The positions of the indicator 1 and the concave mirror 32 are determined by tracing the light path. The light tracing method itself is a known technique and thus its description is omitted.

Figure 10:
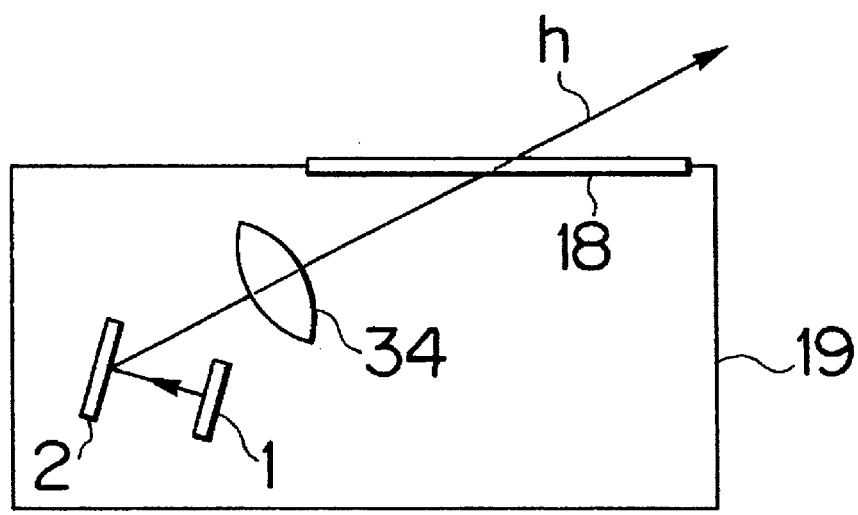
FIG. 10 is a schematic diagram showing an essential part of a third embodiment of the invention.

FIG. 10 shows an essential portion of the third embodiment of the invention. This embodiment uses an optical lens 34 as an enlargement optical system. While in the figure it is shown to be a single convex lens, it may be a group of lenses. It is, however, preferred that the lens structure be as simple as possible to reduce the cost. This embodiment with such a construction achieves the same effect as the second embodiment.

Figure 11:
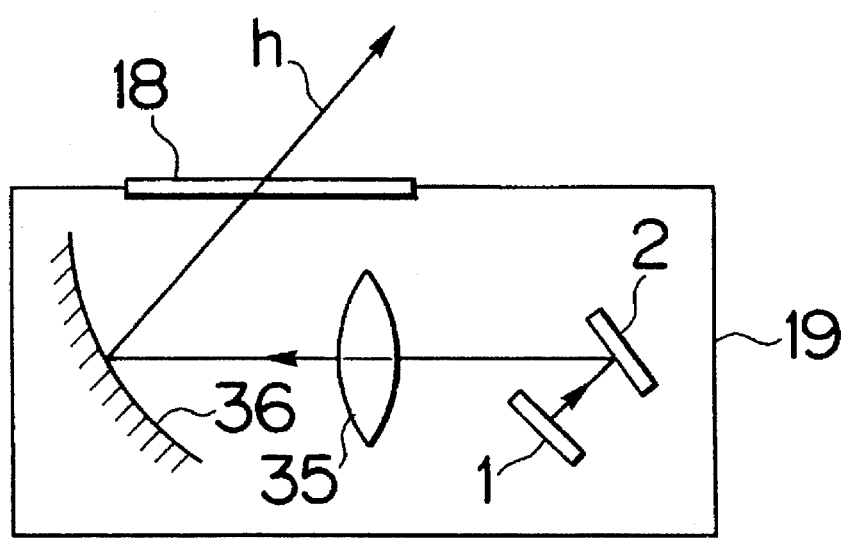
FIG. 11 is a schematic diagram showing an essential part of a fourth embodiment of the invention.

FIG. 11 shows an essential portion of the fourth embodiment of the invention. This embodiment employs an optical lens 35 and a concave mirror 36 as an enlargement optical system. The embodiment with this construction has the same effect as the second embodiment. Various combinations of the convex lenses and the concave mirrors are possible for the enlargement optical system.

When lenses are used, it is preferable to coat them with a reflection prevention film to eliminate the surface reflection influences.

Figure 13:
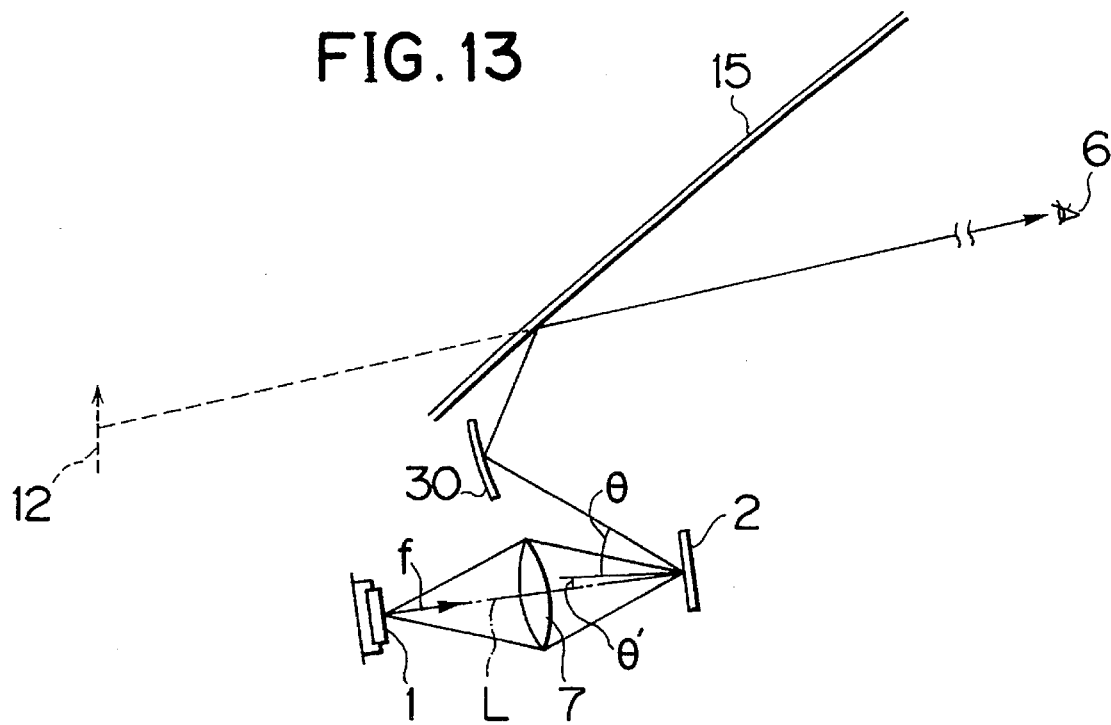
FIG. 13 is a schematic diagram showing an essential part of a fifth embodiment of the invention.

FIG. 13 shows an essential portion of the fifth embodiment of the invention. In this embodiment, a convex lens 7 is arranged between the indicator 1 and the off-axis reflective hologram 2.

The light axis L of the convex lens 7 is aligned with the light axis of the display light f emitted from the indicator 1 to the off-axis reflective hologram 2. The display light f from the indicator 1 passes through the convex lens 7 and is reflected by the off-axis reflective hologram 2 at a reflection angle different from the incident angle toward the concave mirror 30. The reflected light is further reflected by the concave mirror 30 and then the windshield 15 toward the viewing point 6 of the driver.

When external light as from the sun enters the off-axis reflective hologram 2 through the concave mirror 30, only the light in the reflection wavelength band of the off-axis reflective hologram 2 reaches the indicator 1, as in the preceding embodiments. Hence, the abnormal illumination of the indicator 1 can be substantially reduced.

The optical positions of the convex lens 7, indicator 1 and off-axis reflective hologram 2 are determined so that the real image of the display of the indicator 1 is formed on the reflection surface of the off-axis reflective hologram 2.

With this embodiment of the above construction, the display light reflected by the off-axis reflective hologram 2 toward the concave mirror 30 behaves the same way as the light originating from a physical point on the surface of the off-axis reflective hologram 2. This embodiment is identical to a case where the distance d between the indicator 1 and the off-axis reflective hologram 2 in FIG. 5 is set to zero, completely eliminating the blur of the image.

Figure 14:
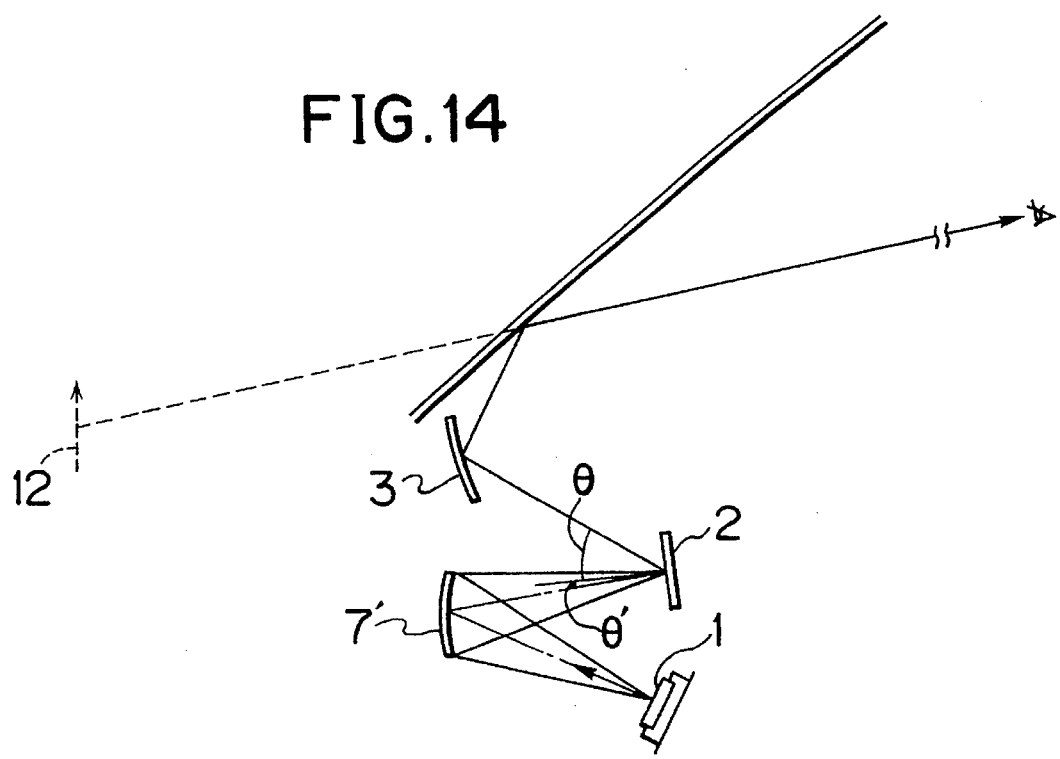
FIG. 14 is a schematic diagram showing an essential part of a sixth embodiment of the invention.

FIG. 14 shows an essential portion of the sixth embodiment of the invention. This embodiment uses a concave mirror 7' in place of the convex lens 7 of the fifth embodiment. The optical position of the concave mirror 7' is so determined that the real image of the display of the indicator i is formed by the concave mirror 7' on the reflection surface of the off-axis reflective hologram 2. Therefore, this embodiment also is equivalent to the case where the distance d between the indicator 1 and the off-axis reflective hologram 2 is set to zero as in the fifth embodiment, thus removing the image blur completely.

In this way, the off-axis reflective hologram can remove influences of external light as well as chromatic aberration, ensuring a clear image of display. Since the chromatic aberration is eliminated, the wavelength band of the display light from the indicator can be widened and the reflection factor of the off-axis reflective hologram can be increased, providing a bright image of the display.

Figure 15:
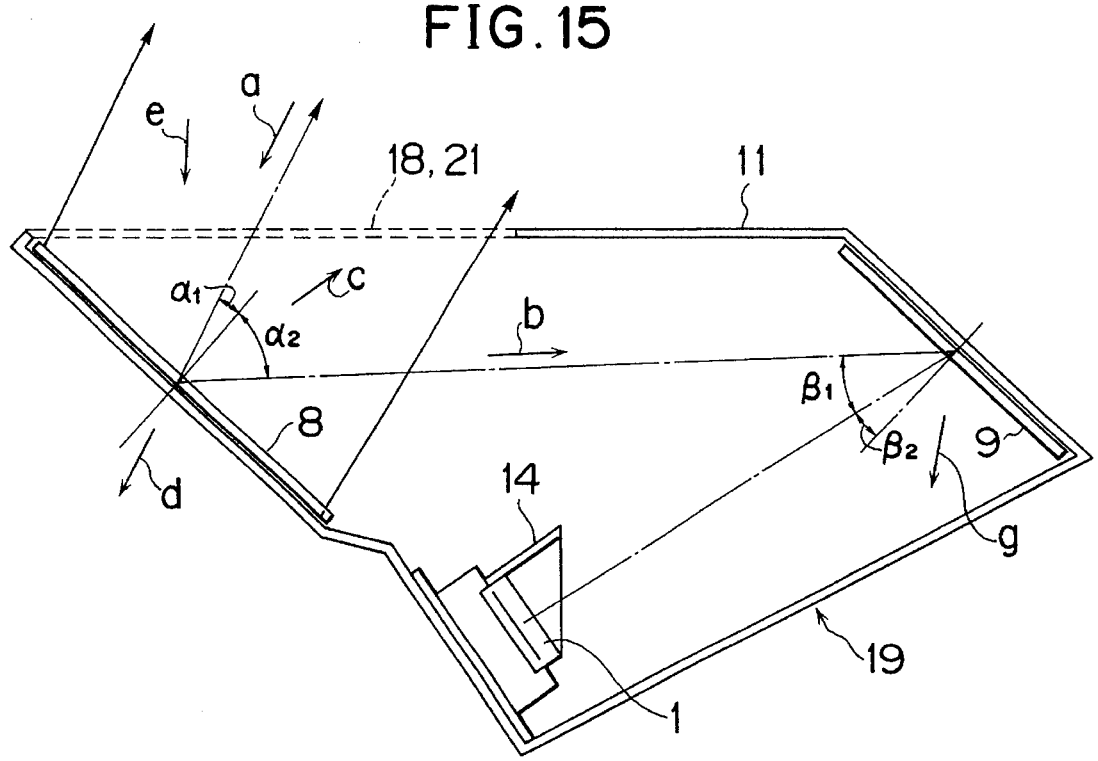
FIG. 15 is a schematic diagram showing an essential part of a seventh embodiment of the invention.

FIG. 15 shows an essential part of the seventh embodiment of the invention. The indicator 1 uses a fluorescent indicator tube. Denoted 8 is a first hologram which is an off-axis reflective hologram with differing incident angle $\alpha_1$ and reflection angle $\alpha_2$. Designated 9 is a second hologram which is also an off-axis reflective hologram as with the first hologram and, to increase the off-axis level, has an incident angle $\beta_1$ and a reflection angle $\beta_2$ set on the same side of a vertical line on the hologram as shown. The both holograms 8, 9 are arranged in a case 11 at such angles that they can reflect and project the display image of the indicator 1 onto the windshield. At a display position one meter ahead from the first hologram 8, the image of the indicator display is magnified five times. The chromatic aberration is compensated for. It is preferred that the back surfaces of the first and second holograms 8, 9 (the side on which no light is incident) be provided with coating to absorb light. Denoted 18 is a window provided in the case 11 which is covered by a transparent flat plate 21 such as a glass plate. Designated 14 is a hood to block the external light from the window from entering the indicator 1.

In the projection optical system unit 19 of this embodiment with the above construction, the display image of the indicator 1 is reflected successively by the second hologram 9 and the first hologram 8 and then projected through the window 18 onto the windshield not shown, which further reflects the display image toward the driver for him to see.

As to the external light, since the first and second holograms 8, 9 are of an off-axis reflective type and have a characteristic of reflecting only the light in a specified wavelength band as shown in FIG. 4 and since their incident angles differ from the reflection angles, the sun light entering, for example, in the direction a reverse to the display light is reflected only in a specified wavelength band by the first hologram 8 in the direction b toward the indicator. A part of the sun light is regularly reflected by the cover glass surface of the first hologram 8 in the direction c, while the light in other than the reflection wavelength band of the hologram passes through the hologram 8 in the direction d. The light that was reflected at the surface in the direction c does not become stray light because of the treatment applied to the inner surface of the case 11, such as black paint. Further, the light that has passed through the hologram 8 in the direction d can be absorbed by the back surface of the first hologram painted black or a absorbing plate provided on the back. The light striking the first hologram 8 from the direction e is regularly reflected at the surface in the direction b. A major part of this light traveling in the direction b, however, is regularly reflected by the second hologram 9 in the direction g, except for the light of a certain wavelength band. Hence, the light that is diffracted by the second hologram 9 to reach the indicator 1 is only the light that has a certain wavelength band. The intensity of this light is sufficiently low so that the display image is never difficult to recognize.

With this embodiment, the influences of external light can be suppressed in a way mentioned above.

Figure 16:
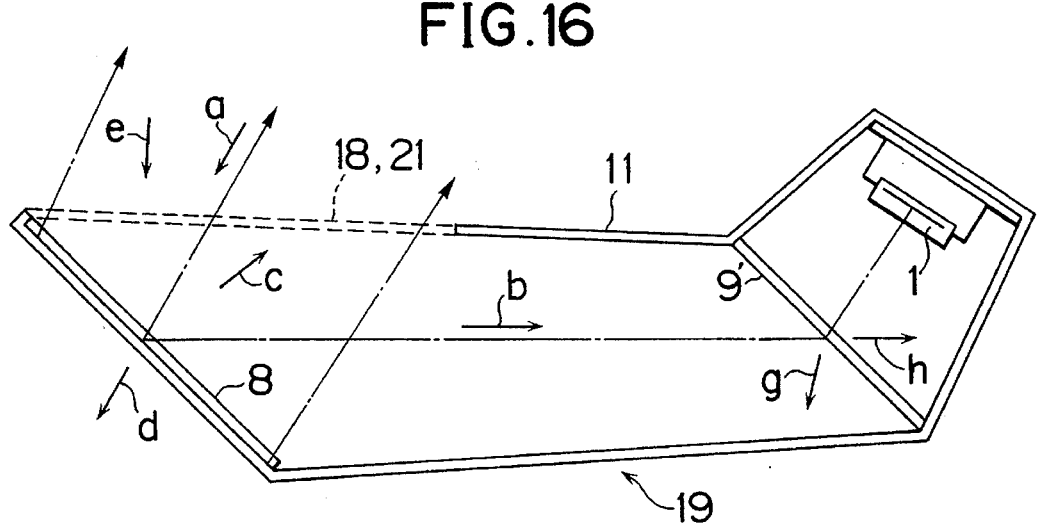
FIG. 16 is a schematic diagram showing an essential part of an eighth embodiment of the invention.

FIG. 16 shows the eighth embodiment of the invention. In the figure, parts identical with those of FIG. 15 are given the same reference numerals.

What this embodiment differs from the seventh embodiment are that the second hologram 9 of this embodiment is a transmissive off-axis hologram as opposed to the reflective off-axis hologram used in the seventh embodiment and that the hood 14 is removed.

In this embodiment with the above construction, the display image of the indicator 1 is transmitted and diffracted by the second hologram 9' and then reflected by the first hologram 8. The display light is further reflected by the windshield not shown toward the driver.

A large part of the sun light entering in the direction a reverse to the display light is either regularly reflected in the direction c or transmitted in the direction d by the first hologram 8. Only the light of a certain wavelength band is reflected in the direction b toward the indicator 1. The sun light coming in from the direction e is reflected at the surface of the first hologram 8 toward the direction b. But a major portion of the reflected light either is regularly reflected by the second hologram 9' in the direction g or passes through it in the direction h. As a result, the light that is diffracted by the second hologram 9' to reach the indicator 1 is only the light of a certain wavelength band. The intensity of the light that has reached the indicator is sufficiently small so that the display image is not rendered difficult to see.

With the seventh and eighth embodiments, two off-axis holograms used to project the display image of the indicator onto the windshield prevent a large part of the sun light that has entered from reaching the indicator, thereby minimizing the abnormal illumination of the indicator.

Figure 17:
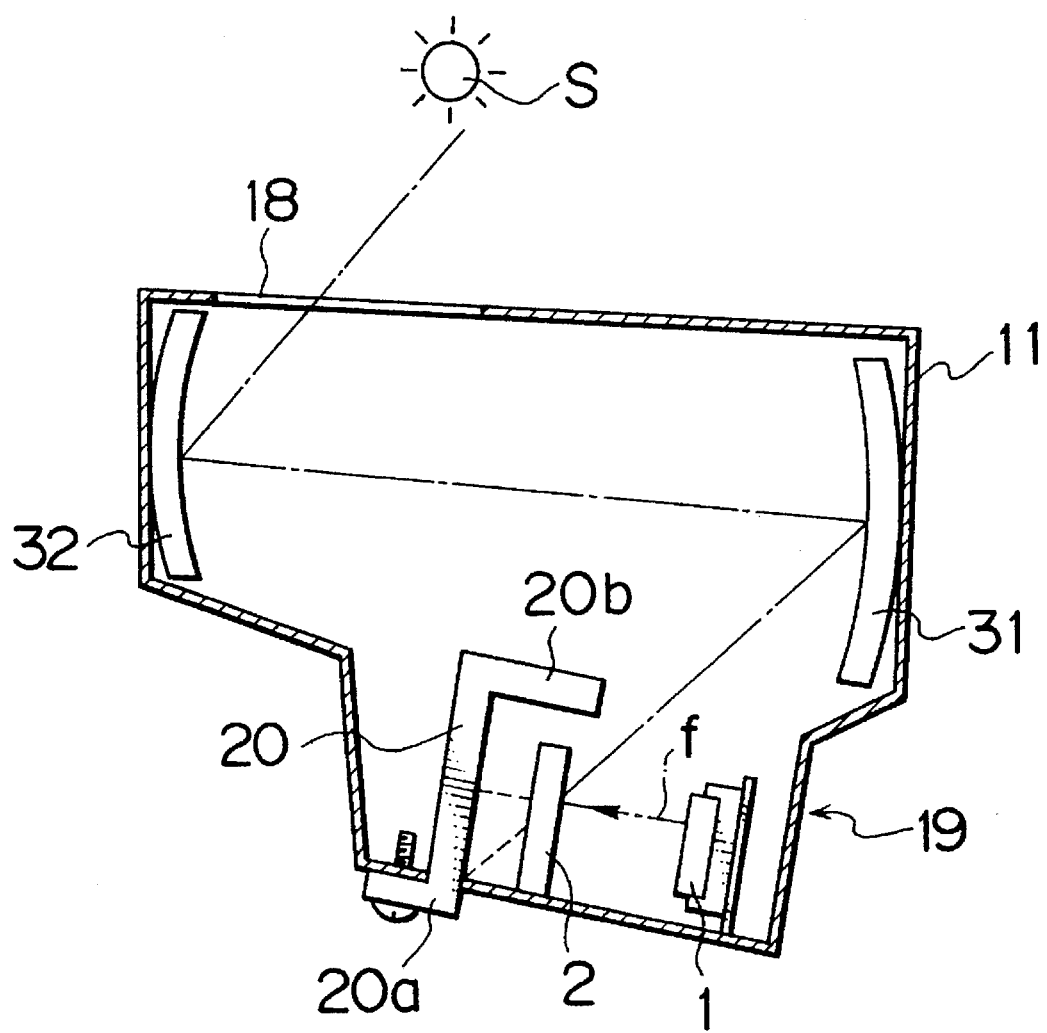
FIG. 17 is a schematic diagram showing an essential part of a ninth embodiment of the invention.

FIG. 17 shows a cross section of an essential part of the ninth embodiment of the invention. As in the second embodiment, the display light f from the indicator 1 is reflected by the off-axis reflective hologram 2, the concave mirror 31 and the concave mirror 32 and passes through the window 18 to reach the windshield not shown, which further reflects it toward the viewing position of the driver.

In FIG. 17, denoted 20 is a heat dissipating member which is added in this embodiment. The heat dissipating member 20 is located behind and separate from the off-axis reflective hologram 2 and receives infrared rays indicated by a dashed line that have transmitted the off-axis reflective hologram 2 in order to dissipate heat.

This construction ensures that the infrared rays that have passed through the off-axis reflective hologram 2 will not strike other than the heat dissipating member 20, preventing thermal deformation or break of other members, which would occur if they were subjected to the infrared rays.

The heat dissipating member 20 is formed, for example, of aluminum die-cast or thermally conductive synthetic resin. To increase the efficiency of releasing heat from the projection optical system unit 19, the base mounting portion 20*a* of the heat dissipating member 20 on the unit 19 is projected out from the unit 19, and the front end of the heat dissipating member 20 is bent to hang over the end of the off-axis reflective hologram 2. The bent portion 20*b* helps prevent the light from getting around the end of the hologram 2 and reaching other component members.

Since the transmission of light to and from the four end surfaces of the off-axis reflective hologram 2 is not desirable, these end surfaces are painted black to prevent light from entering and also prevent the internal reflection of light at the end surfaces.

Figure 18:
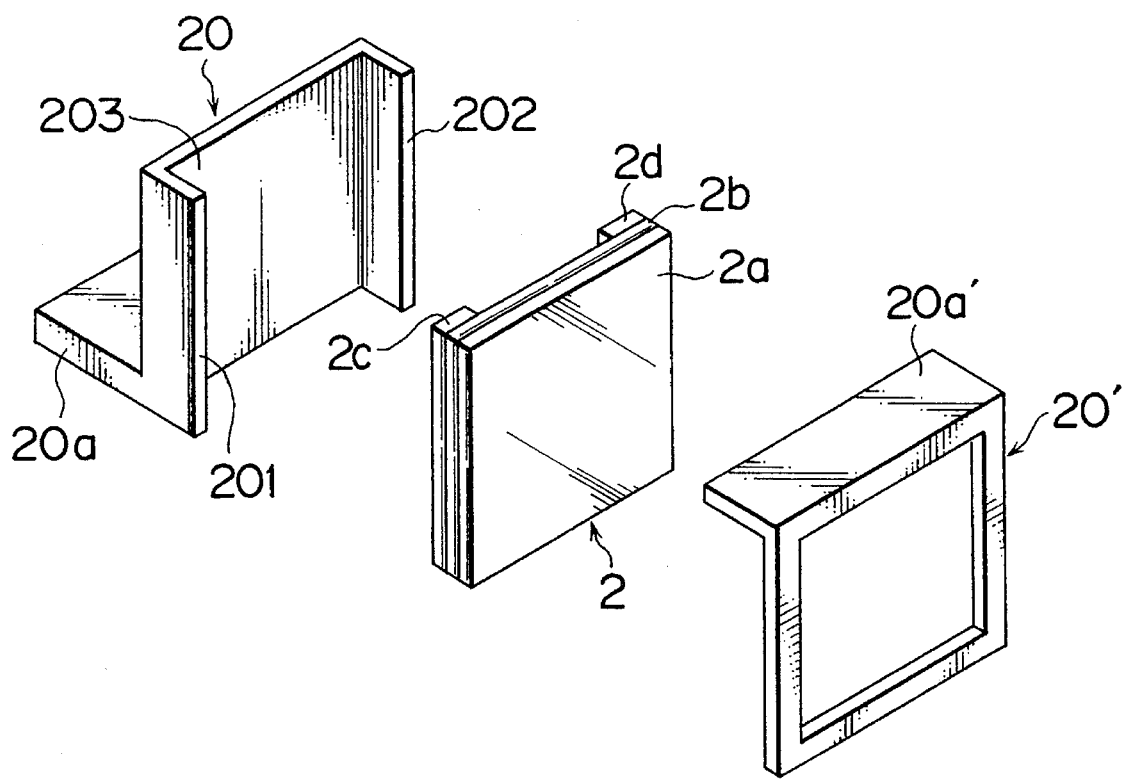
FIG. 18 is an exploded perspective view of a heat dissipating member in a variation of the ninth embodiment.

While in the embodiment of FIG. 18 the heat dissipating member 20 is separately provided behind the off-axis reflective hologram 2, the heat dissipating member 20 may be used not only for dissipating heat but also as a member to fix the hologram 2 to the projection optical system unit 19.

To explain in more detail, the heat dissipating member 20 has a mounting portion 20*a* to be fixed to the projection optical system unit 19 and vertical rising edges 201, 202 on both sides to form a channel 203. The off-axis reflective hologram 2 consists of two glass thin plates 2*a*, 2*b* and a sensitized film clamped between the two glass plates on which a reflective hologram is formed. The hologram 2 also has two strips of heat insulating materials 2*c*, 2*d* attached to the back on each side. The off-axis reflective hologram 2 with the heat insulating materials 2*c*, 2*d* at the back is installed in the channel 203 of the heat dissipating member 20 through the heat insulating materials 2*c*, 2*d* so that it will not directly contact the heat dissipating member 20. In this condition, a window frame member 20' enclosing the outer periphery of the off-axis reflective hologram 2 is secured to the heat dissipating member 20 by a means not shown to securely fix the hologram 2 to the heat dissipating member 20, with the hologram 2 sandwiched between the window frame member 20' and the heat dissipating member 20.

The window frame member 20' is given a low-reflection treatment on its surface to absorb excess light incident on the outer periphery of the hologram 2. The upper end portion of the window frame member 20' is bent so that a bent portion 20*a*' encloses the upper end surface of the hologram 2 accommodated in the channel 203 of the heat dissipating member 20. Hence, the right and left end surfaces and the upper end surface of the off-axis reflective hologram 2 are masked, preventing light from passing through these end surfaces of the hologram 2.

Figure 19A:
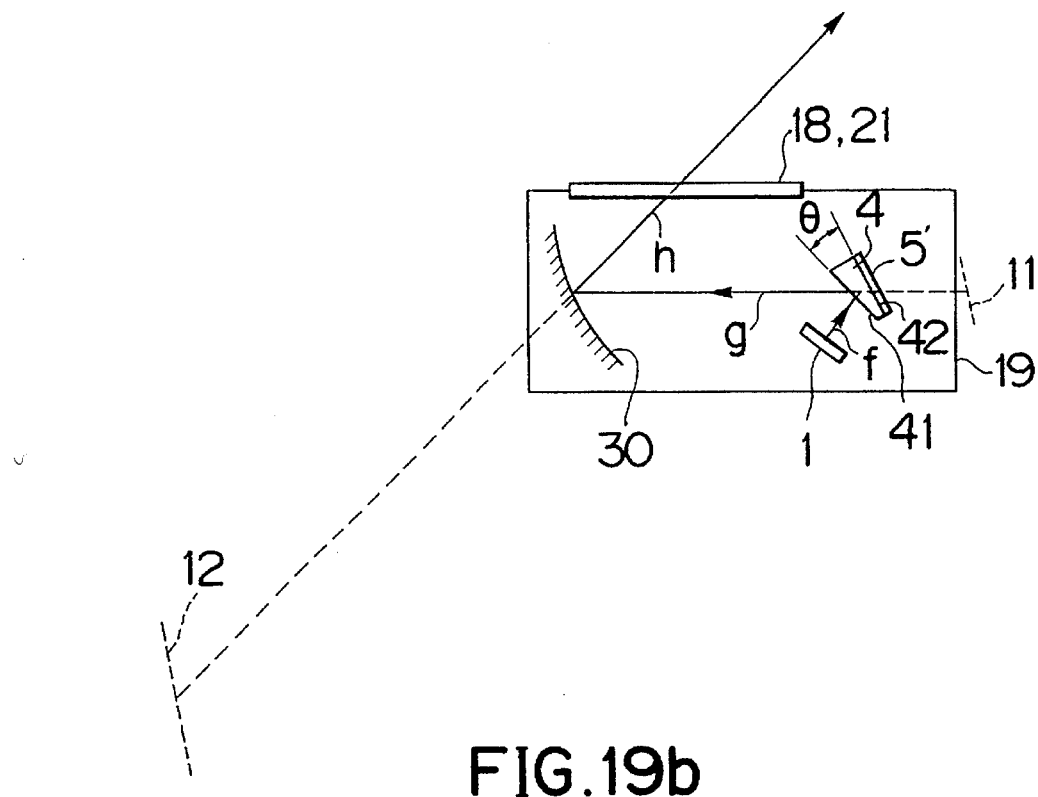
FIGS. 19a and 19b are schematic diagrams showing essential parts of a tenth embodiment of the invention.
Figure 19B:
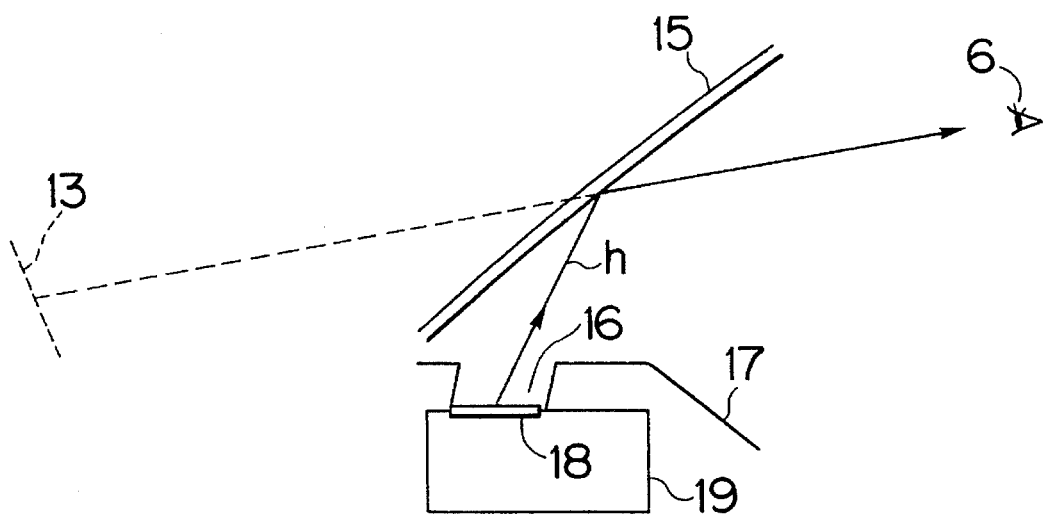
Figure 20:
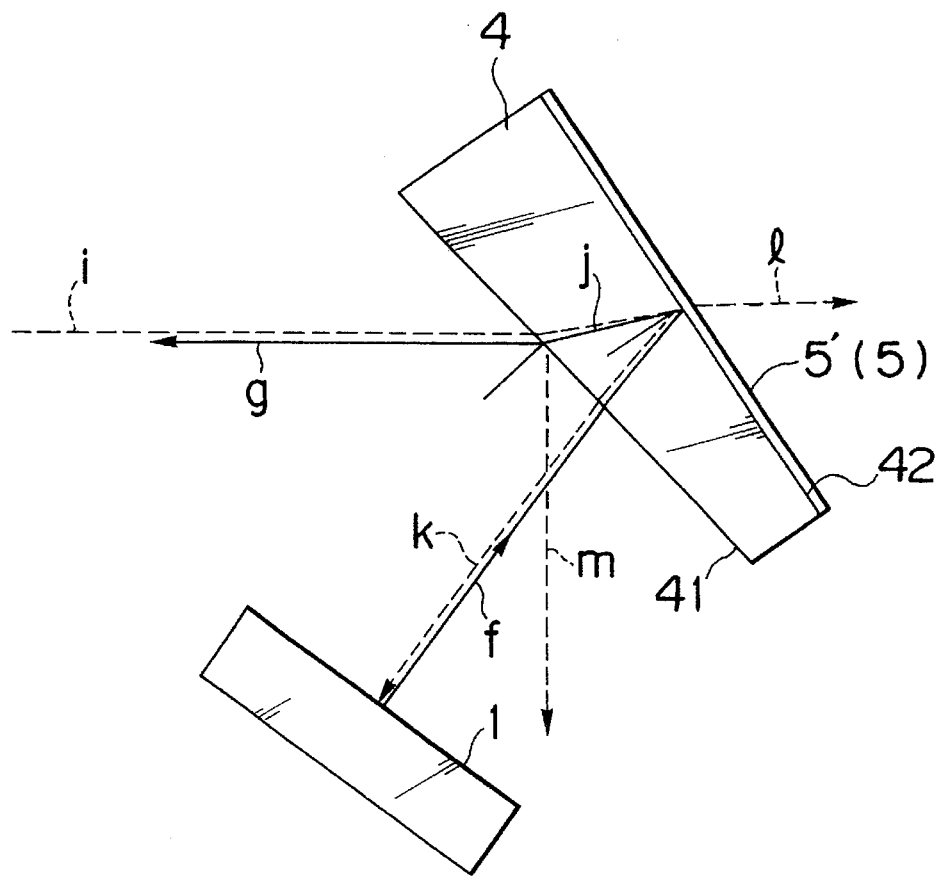
FIG. 20 is a diagram showing the indicator and a prism element used in the tenth embodiment and their relationship with the direction of propagation of the display light.

FIGS. 19 and 20 show the tenth embodiment of the invention. The tenth and the following eleventh to thirteenth embodiments employ a prism element as the off-axis reflective member.

FIG. 19*a* shows the construction of the projection optical system unit and FIG. 19*b* shows the projection optical system unit mounted on a car. FIG. 20 shows the indicator and prism element making up the projection optical system of the embodiment and their relationship with the direction of propagation of the display light.

In FIG. 19a, denoted 1 is an indicator (fluorescent indicator tube) showing the speed of a car and readings of other meters. Designated 4 is a prism that has an apex angle of θ formed by two planes 41, 42. Of the two planes, the plane 42 is formed with a regular reflective hologram 5' as a film 5 having a wavelength selectivity. The indicator 1 and the prism 4 are arranged in such a way that the plane 41 of the prism 4 not formed with a regular reflective hologram 5' is not parallel to but is at a certain angle with the surface of the indicator 1. This is to prevent the reflected light from the prism from overlapping the display image. Denoted 30 is a concave mirror provided as an enlargement optical system. Designated 18 is a window through which the display light is projected outwardly and which is covered with a transparent plate 21 to hermetically enclose the projection optical system unit 19. The projection optical system unit 19 with the above construction is installed inside the dashboard 17 of a car as shown in FIG. 19b. The dashboard 17 has an opening 16 allow the display light to be projected outwardly. The windshield 15 may be coated with a thin metal film, a dielectric film or a regular reflection type hologram film to set the reflection factor and the transmission factor at proper levels.

As shown in FIG. 19a, with the projection optical system unit 19 mounted in the car, the display light f emitted from the indicator 1 is radiated against the prism surface 41, and the light that has reached the back surface 42 is reflected by the hologram 5' to go out from the prism surface 41. The light g reflected by the prism 4 forms a virtual image 11 and then is reflected by the concave mirror 30 provided as an enlargement optical system. The concave mirror 30 forms an enlarged virtual image 12 at a remote position. The light h reflected by the concave mirror 30 passes through the window 18, which encloses the projection optical system unit 19, and is projected outwardly. The angle at which the light h is projected outwardly is such that, as shown in FIG. 19b, the display light h from the unit 19 is partly reflected by the windshield 15 toward the viewing point 6 of the driver. Now, the driver can see the display at the position of a virtual image 13 within the viewing field.

Next, the action of this embodiment concerning external light will be explained by referring to FIG. 20.

In the figure, the sun light i coming in a direction reverse to the display light g is partly reflected by the surface 41 of the prism 4 toward the direction m. The reflected light does not enter the indicator 1 because the surface 41 of the prism 4 is not parallel to the surface of the indicator 1. The remainder of the sun light i is refracted into the prism 4 as indicated by a dashed line j and passes through the regular reflective hologram 5' in the direction l, with the result that only the light k in that particular wavelength band is reflected as indicated by the dashed line to reach the indicator 1. The illumination of the indicator by this component of light cannot be avoided but the amount of radiation received by the indicator 1s significantly small as compared with that from the direct sun rays.

In this way, the prism 4 regularly reflects light at its surface 41 and at the same time acts as an off-axis reflection member in which the incident and reflection angles formed by the incident display light f and the outgoing display light g with respect to the surface 41 are different from each other.

Figure 12:
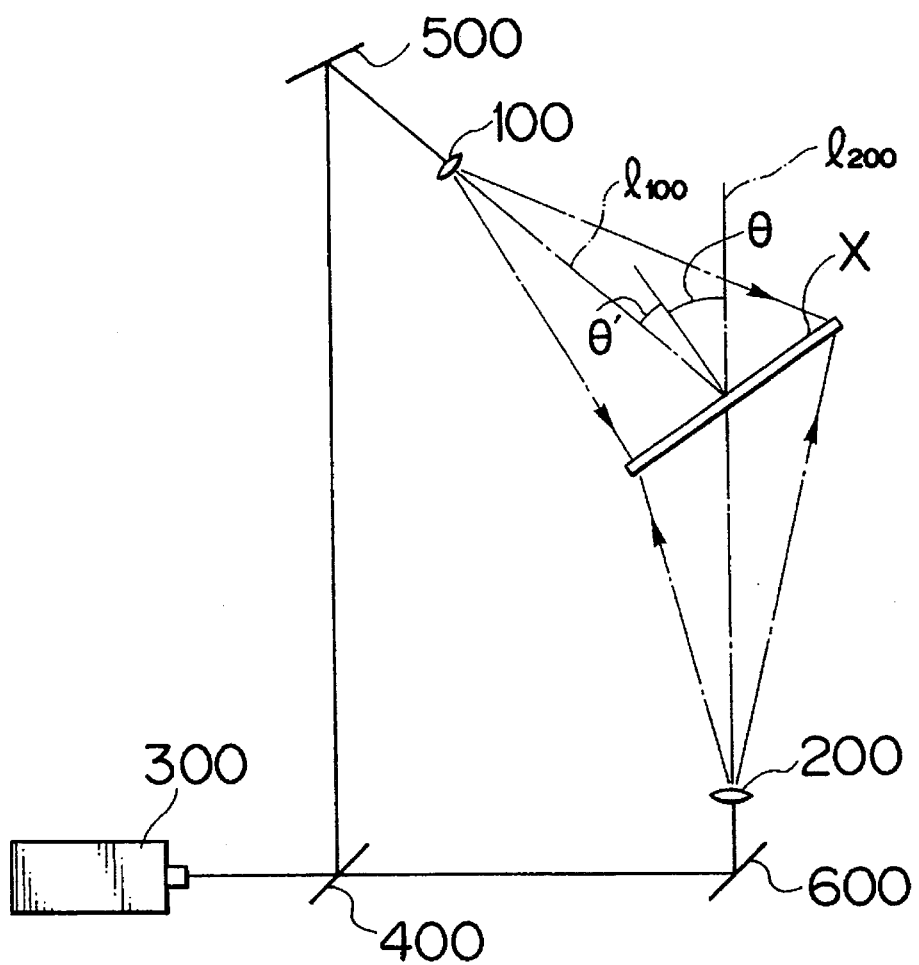
FIG. 12 is a diagram showing the process of making the hologram used in the embodiment of this invention.

The regular reflective hologram 5' may be formed by using a hologram dry plate and an interferometric exposure setup like those shown in FIG. 12. For example, two planar waves may be radiated against the opposite surfaces of the hologram dry plate at equal incident angles to cause interferences. The reflection wavelength band of the hologram is set close to the peak value in the spectrum of light emitted from the indicator 1. A regular reflective hologram (interference fringes are parallel to the hologram surface) has no chromatic aberration, so that there is no problem in using a single regular reflective hologram. (Generally, when holograms are used in an image formation system, two holograms are combined to compensate for chromatic aberrations.) The area of the hologram 5' is set almost equal to or somewhat larger than the display area of the indicator 1. The precise area required depends on the size of an element making up the enlargement optical system (in this case the concave mirror 30) and on the range of driver's viewing point (or viewing range) through which the driver can see the display.

Figure 21:
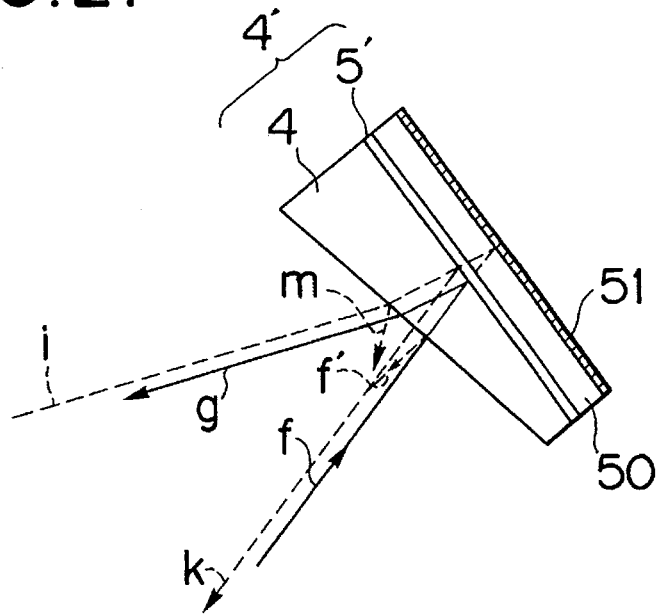
FIGS. 21 and 22 are schematic diagrams showing other prism elements in the tenth embodiment.
Figure 22:
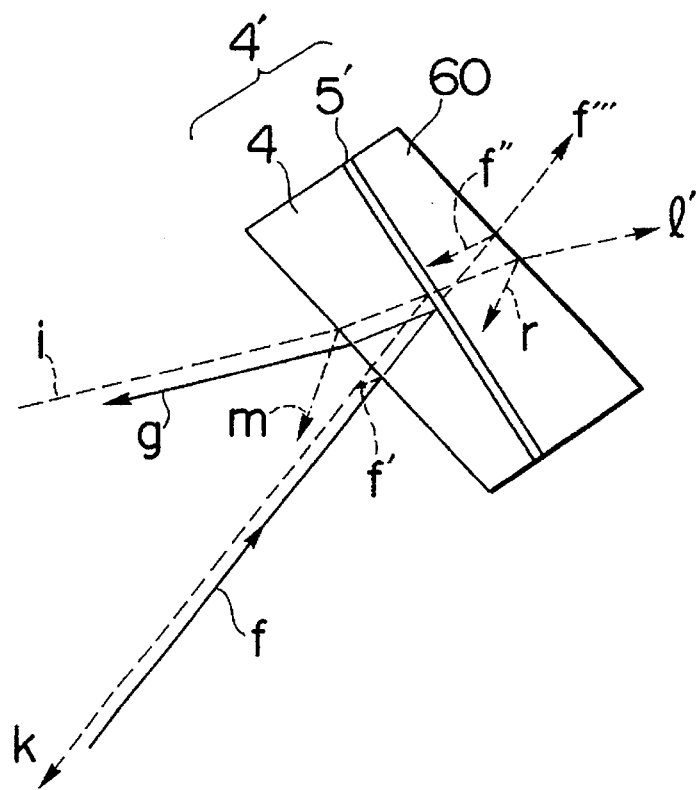

Although in FIG. 20 we did not mention the reflection at the hologram surface, there is, however, a component of sun light whose wavelength is not reflected by the hologram 5' but which is reflected by the hologram surface to proceed toward a direction indicated by the dashed line k. To eliminate this component, a transparent flat plate 50 attached with a reflection prevention means 51 may be bonded to the hologram surface as shown in FIG. 21. Or, as shown in FIG. 22, a prism 60 may be bonded to the hologram surface to prevent the regularly reflected light from entering the indicator. In FIGS. 21 and 22, the surface-reflected components f', f" of the display light and the surface-reflected components m, r of the sun light are not in the same directions as g and k.

While in the foregoing embodiments, we have employed the regular reflective hologram, it is possible to use a mirror coated with a dielectric multi-layered film. It is noted that since the multi-layered film mirror with a desired wavelength selectivity is generally expensive, the use of hologram is advantageous costwise especially when the area is large.

Figure 23:
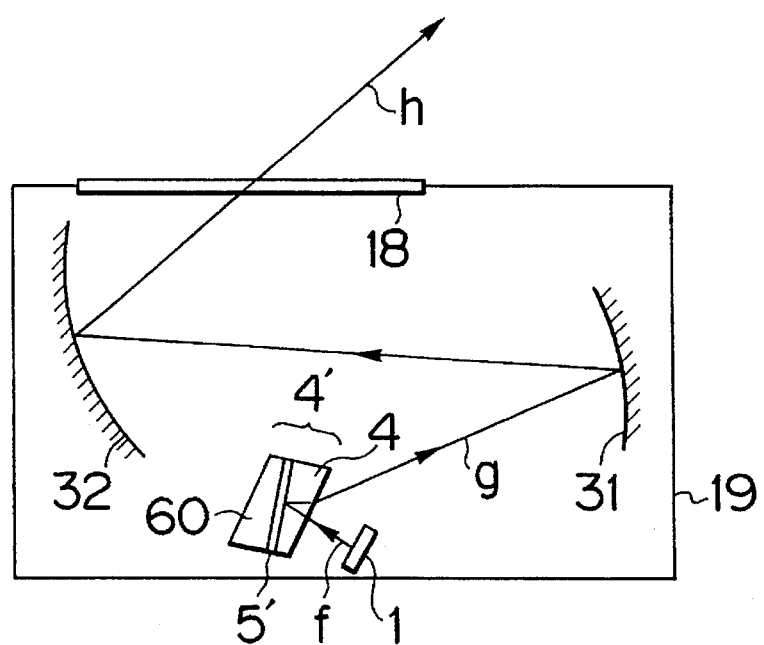
FIG. 23 is a schematic diagram showing an essential part of an eleventh embodiment of the invention.

FIG. 23 shows an essential part of the eleventh embodiment of the invention. The embodiment employs a prism element 4' constructed as shown in FIG. 22. This embodiment uses two concave mirrors 31, 32, as in the second embodiment (FIG. 6), to increase the magnification factor.

Figure 24A:
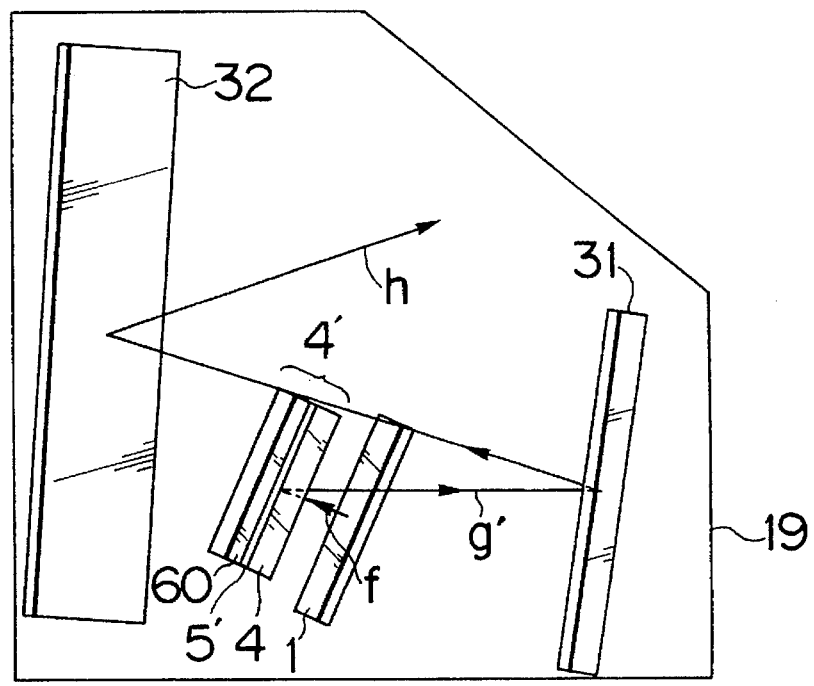
FIGS. 24a and 24b are schematic diagrams showing a variation of the eleventh embodiment.
Figure 24B:
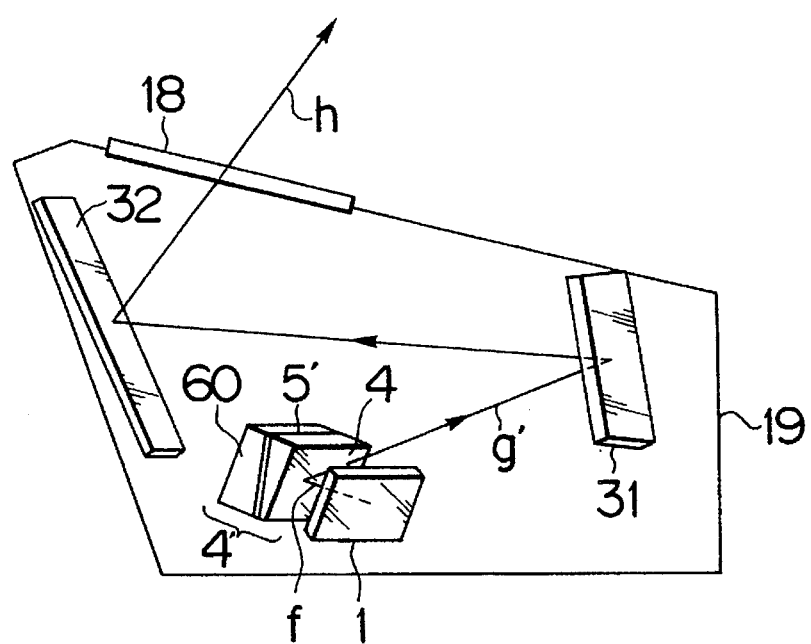

FIGS. 24a and 24b show a variation of the eleventh embodiment, an example of the projection optical system unit 19 applicable for the situation in FIG. 7.

FIG. 24a is a plan view and FIG. 24b is a side view. Constitutional elements are the same as those of FIG. 23—indicator 1, prism element 4', and concave mirrors 31, 32—but arranged differently.

Figure 25:
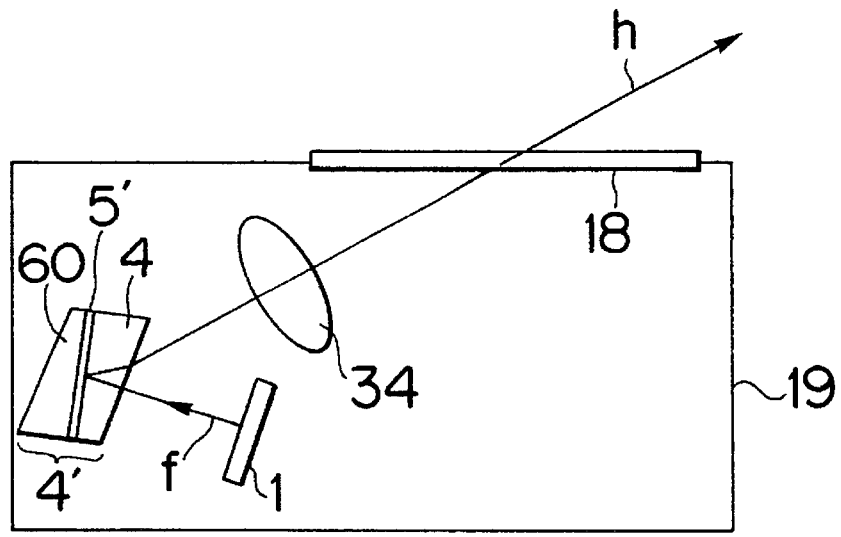
FIG. 25 is a schematic diagram showing an essential part of a twelfth embodiment of the invention.

FIG. 25 shows an essential part of the twelfth embodiment of the invention. This embodiment employs an optical lens system 34 as the enlargement optical system, as in the third embodiment (FIG. 10).

Figure 26:
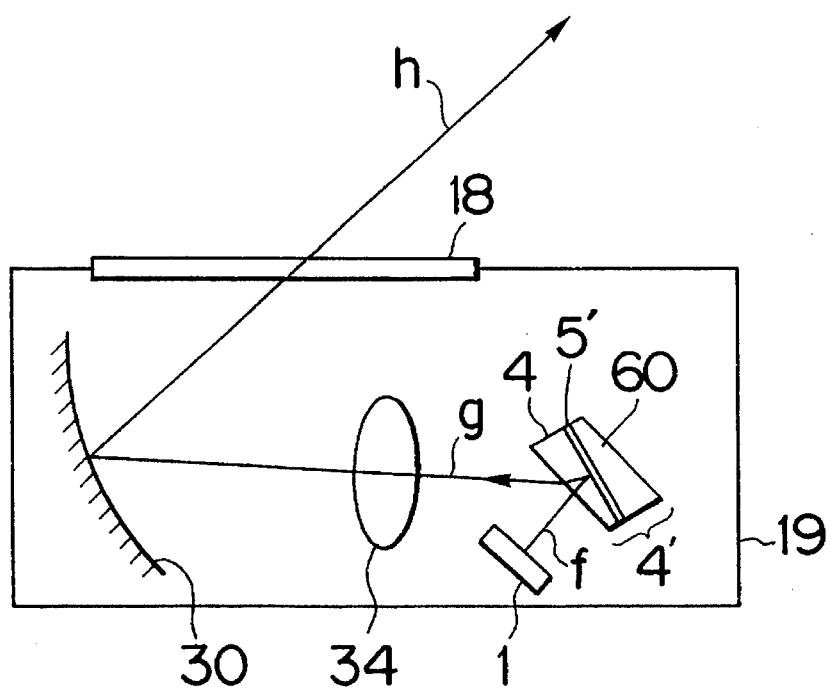
FIG. 26 is a schematic diagram showing an essential part of a thirteenth embodiment of the invention.

FIG. 26 shows an essential part of the thirteenth embodiment of the invention. This embodiment combines the enlargement optical lens system 34 and the concave mirror 30 as in the fourth embodiment (FIG. 11).

There may be times when the driver feels annoyed by the display image directed toward him because not only does it partly obstruct his view but, in the display of speed, the display segments repetitively turn on and off at all times.

Hence, it is desired that the display be able to be seen by the driver in a diagonal or slant direction with respect to the forward direction of the car. In a car with a steering wheel mounted on the right-hand side, the display is seen diagonally to the left in front of the driver; and in the case of a left-hand side steering wheel, it is seen diagonally to the right in front of the driver.

Figure 27:
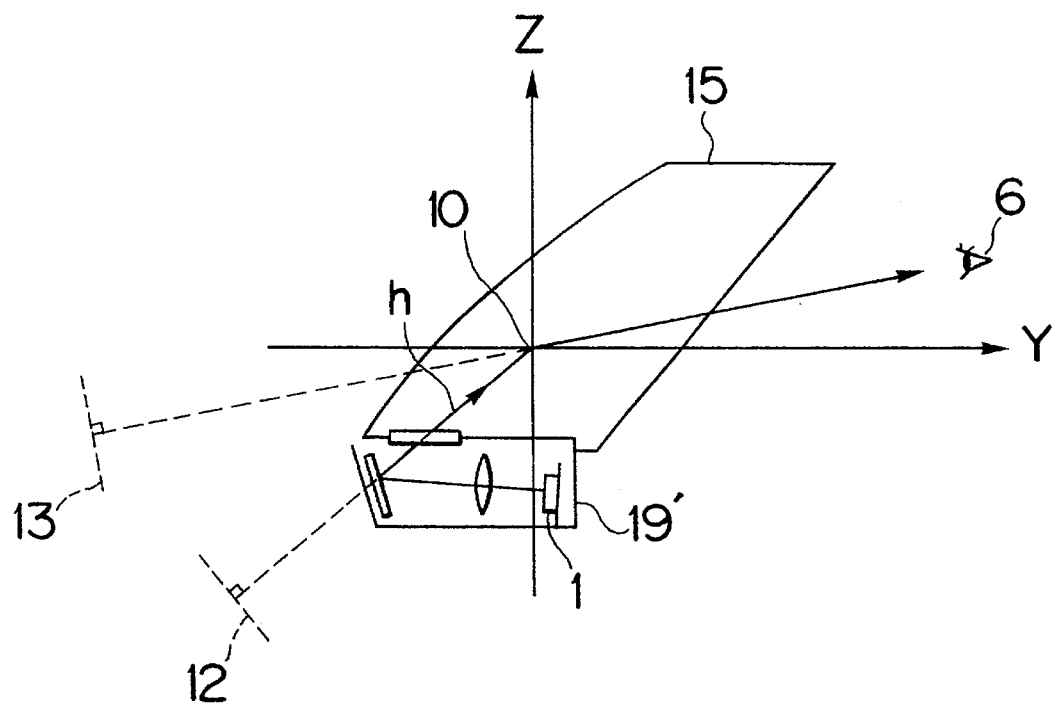
FIG. 27 is a diagram showing the direction of propagation of the display light in a conventional headup display apparatus.

As shown in FIG. 27, at a point 10 where the display light h is reflected by the windshield 15, the surface of the windshield 15 is usually slanted from the driver. That is, in the case of a right-hand side steering wheel, the normal line of the windshield 15 is directed downwardly to the left of the driver. In the case of a left-hand side steering wheel, it is directed downwardly to the right. Hence, when the headup display module is placed horizontal, the virtual image 13 is rotated as a result of reflection by the windshield 15.

Figure 28B:
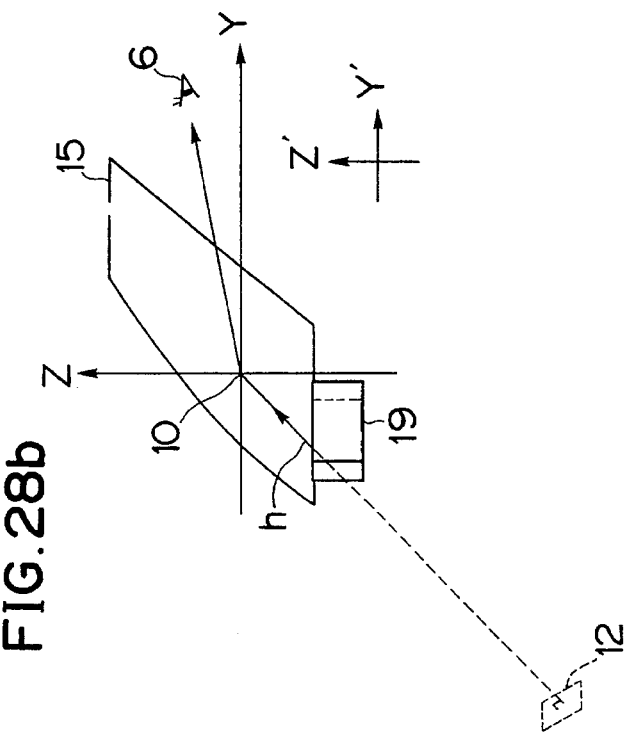
FIGS. 28a, 28b and 28c are diagrams showing how the display image is rotated by the windshield.
Figure 28A:
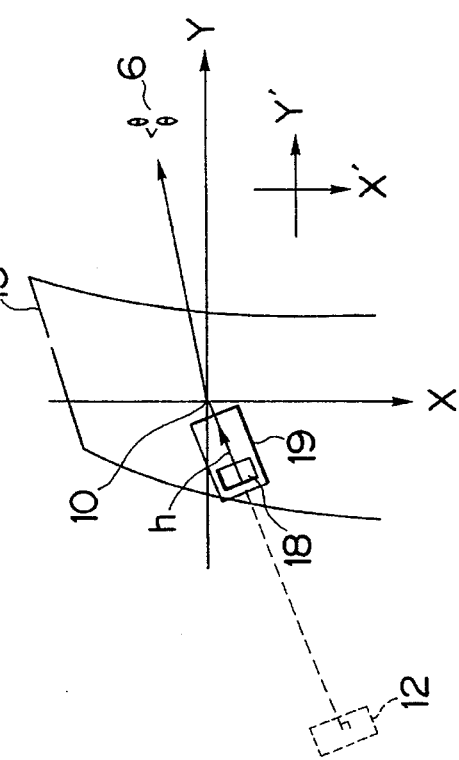
Figure 28C:
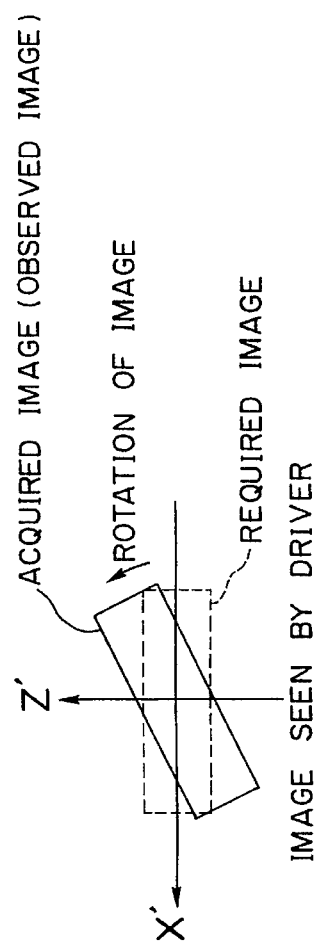

FIGS. 28a, 28b and 28c illustrate the process of image rotation by the windshield, with FIG. 28a being a plan view as seen from above, FIG. 28b a side view, and FIG. 28c a view as seen by the driver. Suppose the display image on the indicator 1 is a laterally long rectangle. The display image is rotated clockwise or counterclockwise according to the direction of the normal line at the reflection point 10 on the windshield 15. In the case of a right-hand side steering wheel, it is rotated counterclockwise when viewed from the driver.

Hence, when the projection optical system unit 19' is installed, it is necessary to compensate for the rotation of the image so that the image can be seen properly.

FIGS. 29a, 29b and 29c illustrate a conventional method of compensating for the rotation of image, with FIG. 29a representing a plan view as seen from above, FIG. 29b a side view and FIG. 29c a view as observed by the driver. In the conventional system, the projection optical system unit 19', when it is installed in the car, is rotated in a reverse direction by the same angle as the rotation of the image.

Figure 30A:
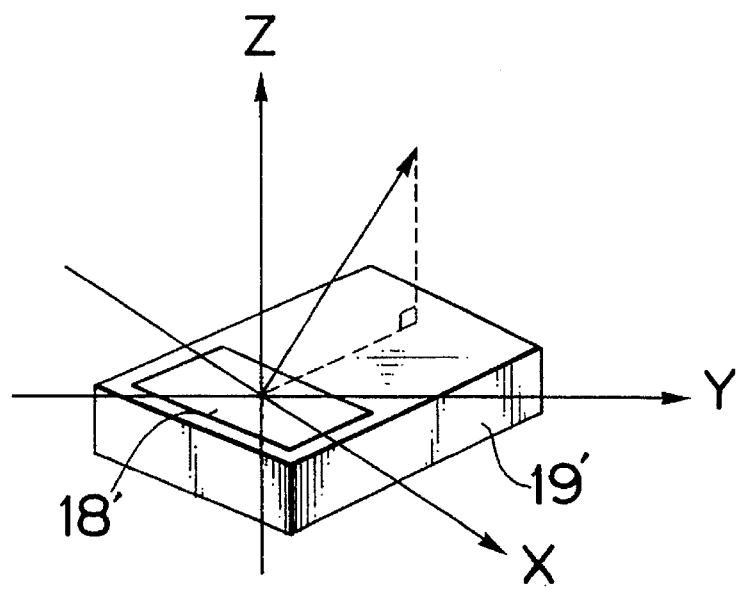
FIGS. 30a and 30b are diagrams illustrating the problems that a fourteenth embodiment of the invention is intended to solve.
Figure 30B:
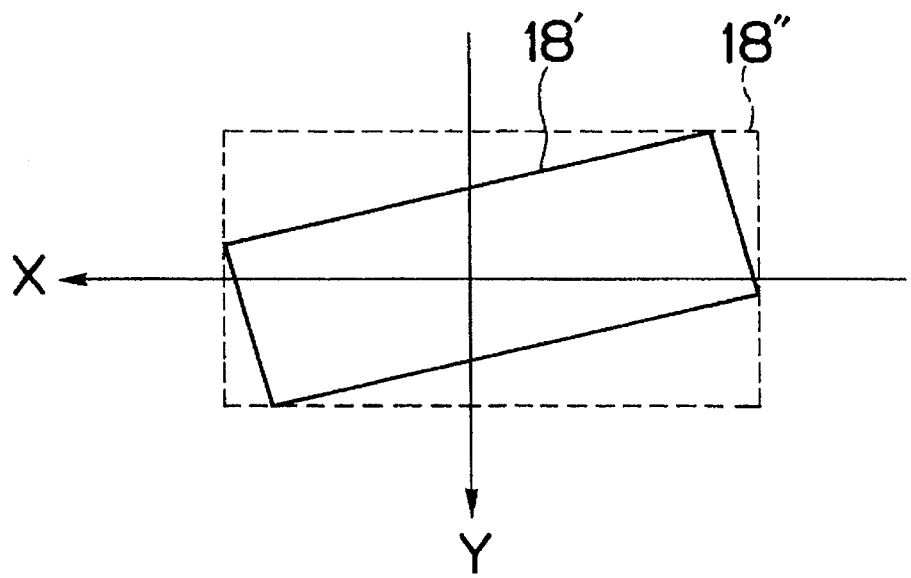

In the above construction, since the projection optical system unit 19' itself is rotated, the external size becomes large and, as shown in FIG. 30a, the window 18' is disposed slantwise relative to the forward direction of the car, marring the car's appearance. Furthermore, to make the window 18' a rectangle whose longer side is at right angles with the forward direction of the car, it is necessary to increase the size of the window 18" to secure the sufficient viewing range because the virtual image 13 is rotated. This in turn makes the external light countermeasures difficult to incorporate.

The fourteenth embodiment described below, considering the problems mentioned above, makes the window of the projection optical system unit as small as possible to reduce the influences of external light and at the same time compensate for the image rotation caused by the windshield.

Figure 31A:
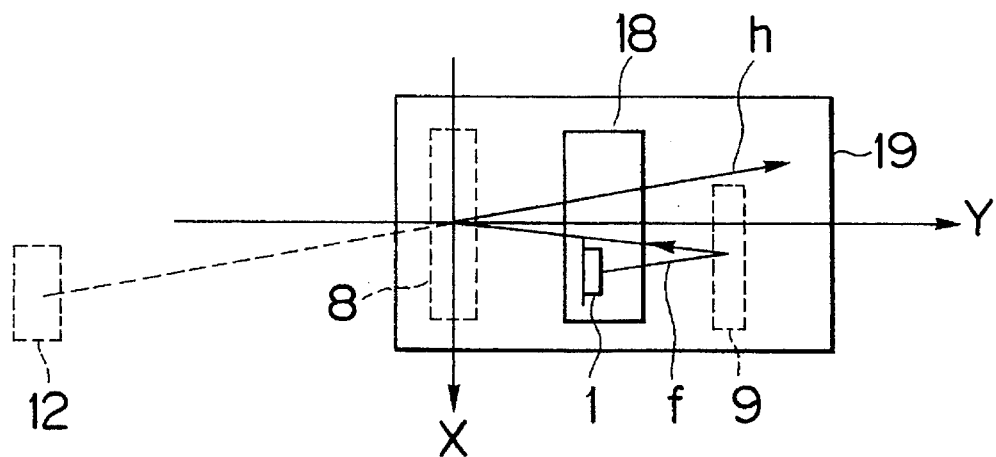
FIGS. 31a and 31b are schematic diagrams showing essential parts of the fourteenth embodiment of the invention.
Figure 31B:
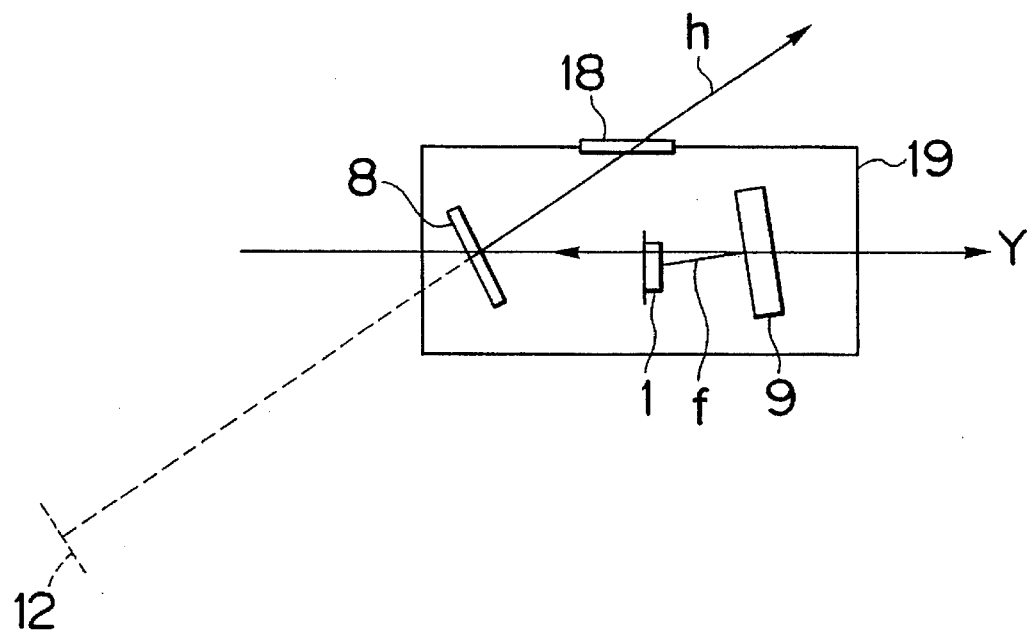

FIGS. 31a and 31b show the fourteenth embodiment of the invention, with FIG. 31a being a plan view and FIG. 31b a side cross section. The projection optical system unit 19 of this embodiment has an indicator (fluorescent indicator tube) 1 and first and second holograms 8, 9. The first and second holograms 8, 9 are off-axis holograms as in the seventh embodiment. The display light f from the indicator 1 is reflected first by the second hologram 9 and then by the first hologram 8 to pass through the window 18 and reach the windshield not shown, which further reflects it toward the viewing point of the driver.

These two holograms 8, 9 prevent a large portion of the external light as from the sun from reaching the indicator 1, as in the seventh embodiment, thus minimizing the abnormal illumination of the indicator.

A virtual image 12 is formed by the holograms 8, 9. The first hologram 9 and the indicator 1 are shifted toward the direction X from the Y axis with respect to the second hologram 8 so that the virtual image 12 will be parallel to the car bumper (perpendicular to the forward direction of the car). The display light h propagating from the virtual image 12 to the windshield is projected through the window 18. The window 18 is rectangular in shape and its two sides are at right angles with the forward direction of the car (−Y direction).

Figure 32A:
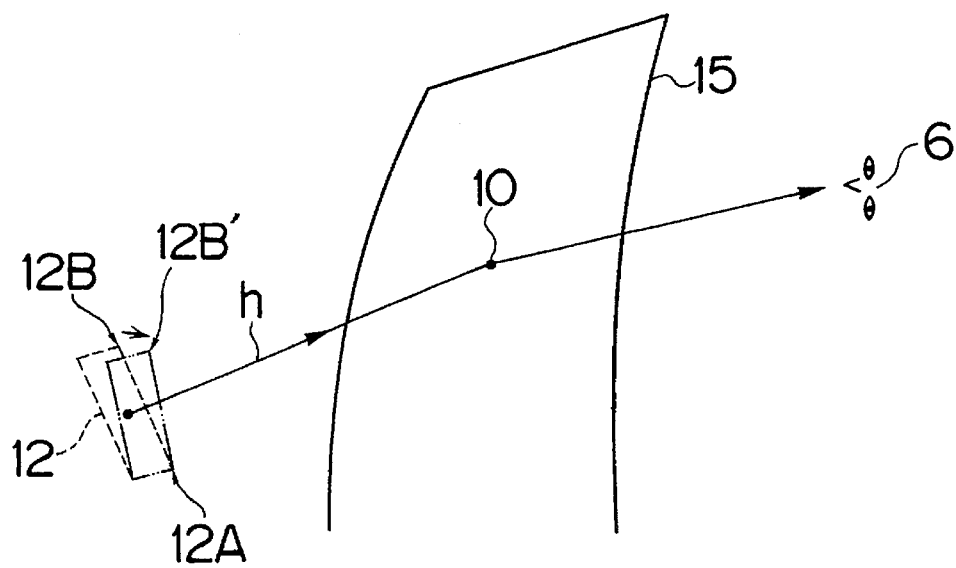
FIGS. 32a and 32b are diagrams illustrating the principle of correcting the image rotation in the fourteenth embodiment.
Figure 32B:
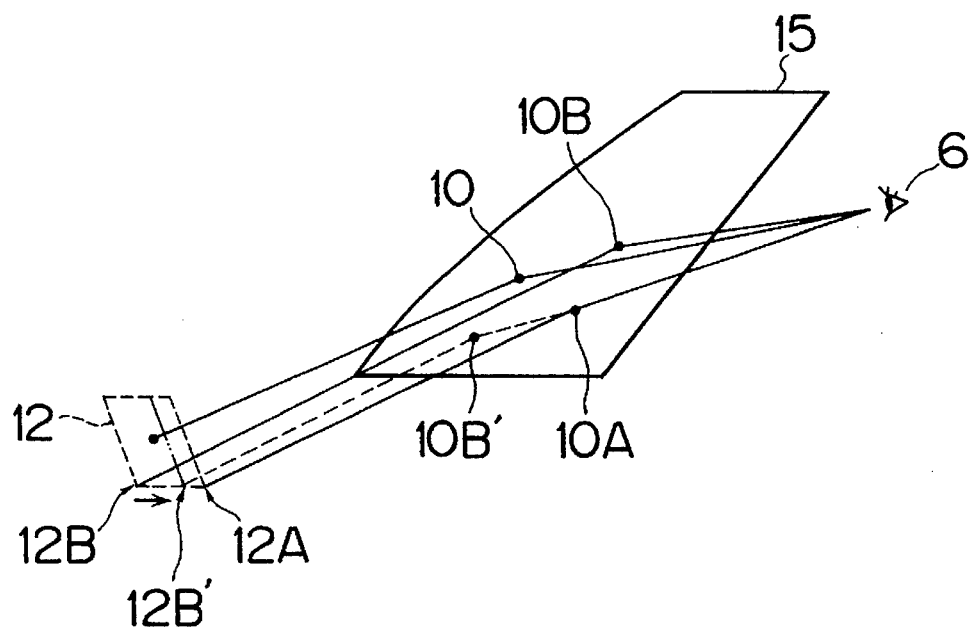

FIGS. 32a and 32b illustrate the working principle of this embodiment, with FIG. 32a representing a plan view as seen from above and FIG. 32b a side view. In the figures, of bottom points of the virtual image 12, the point near the center of the car is taken as a point 12A and the point near the side as a point 12B. Since the display light h going from the virtual image 12 to the windshield 15 generally strikes the windshield slantwise, the directions in which the rays of light from the points 12A and 12B travel to the driver's eye 6 differ from each other in the vertical direction. This is the cause for the rotation of the image. Let us consider the point 12A on the virtual image 12 as fixed. If the light from the other point 12B was made to reach the eye from the same height as the light of the point 12A, the display image would not rotate. Now, if the point 12B is shifted in the direction of arrow (from 12B to 12B'), the direction of light reaching the eye is the same as that of the light from the point 12A in terms of the vertical direction. When the display image is projected diagonally to the left in front of the driver in the case of the right-hand side steering wheel or when it is projected diagonally to the right in front of the driver in the case of the left-hand side steering wheel, the positions of point 12A and point 12B' can be seen overlapped when viewed from the side. In other words, the projection optical system unit 19 is so constructed that the bottom line of the virtual image 12 formed by the unit 19 is almost at right angles with the forward direction of the car, the rotation of the display image can be compensated for.

The virtual image 12 is looked at slantwise. But since the horizontal line of the virtual image 12 is almost at right angles with the forward direction of the car, the horizontal direction of an image obtained when the display light h is cut off by the window 18 is perpendicular to the forward direction of the car, making it possible to reduce the window 18 of the projection optical system unit 19.

Figure 33A:
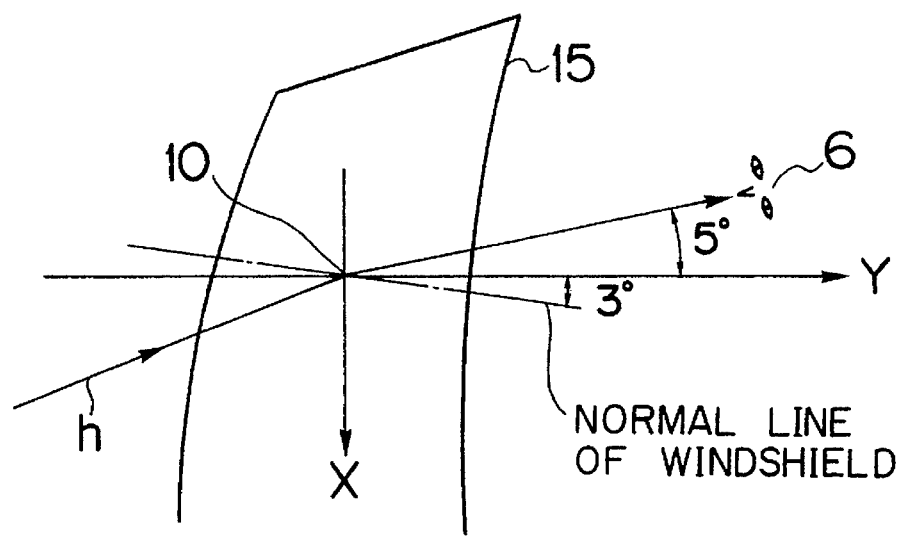
FIGS. 33a and 33b are diagrams showing the shape of the windshield used in the fourteenth embodiment and the method of producing the display.
Figure 33B:
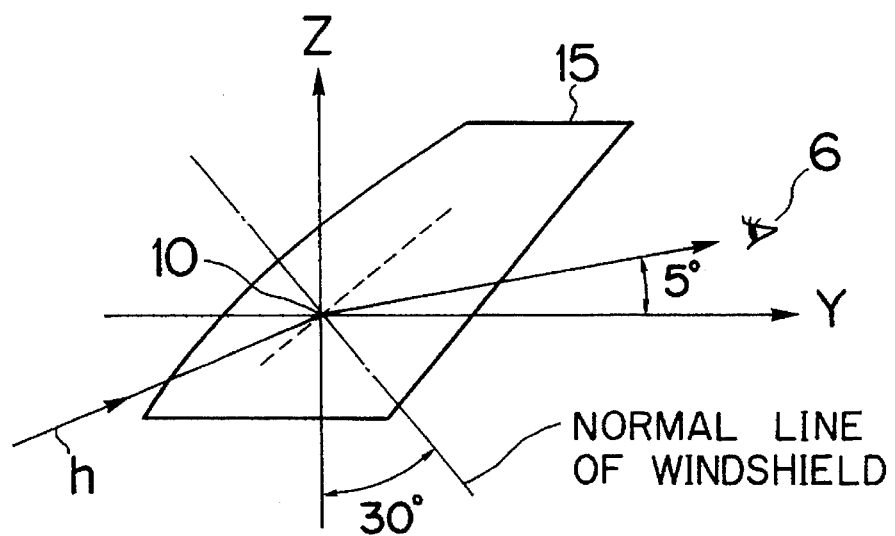

FIGS. 33a and 33b illustrate the shape and display direction of the windshield used in this embodiment, with FIG. 33a representing a plan view of a car and FIG. 33b representing a side view.

Figure 34:
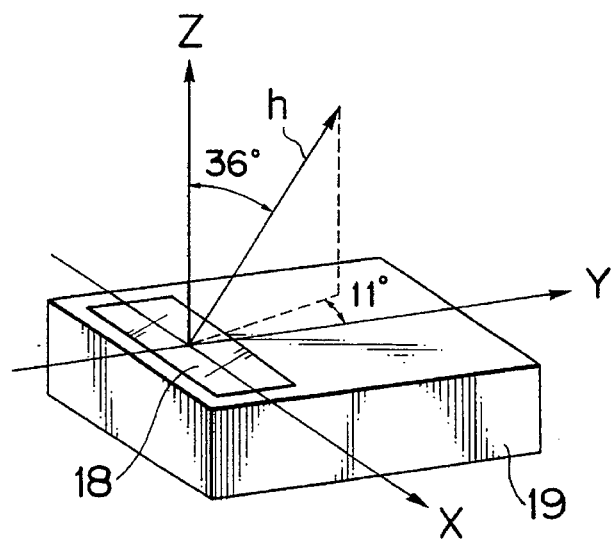
FIG. 34 is a schematic diagram illustrating in which direction the light beam is radiated from the projection optical system unit in the fourteenth embodiment.
Figure 35:
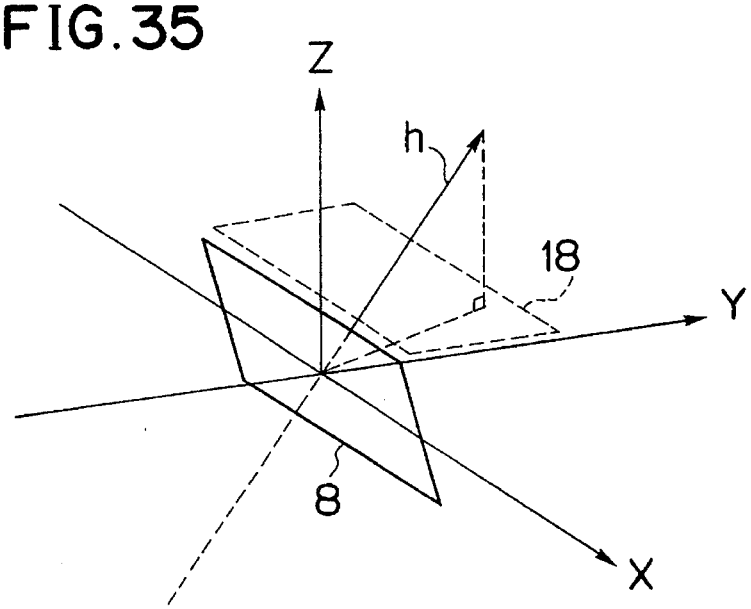
FIG. 35 is a schematic diagram showing the relationship between the light beam radiated from the projection optical system unit and a virtual image in the fourteenth embodiment.
Figure 35:
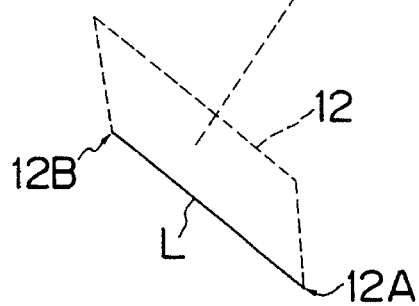

It is assumed that the car moves in the direction of −Y, and an X axis extends toward the left of the driver and a Z axis extends vertically upward. In a car with a right-hand side steering wheel, it is assumed that the driver sees the display image five degrees to the left and five degrees downward. It is also assumed that the normal line of the windshield at the reflection point 10 extends as shown. Under these condition, the display light h comes out of the projection optical system unit 19 in the direction as shown in FIG. 34. The coordinate system of FIG. 34 is the coordinate system of FIG. 33 parallelly shifted so that its origin is located at the window 18 of the projection optical system unit 19. The coordinate system of FIG. 35 is the coordinate system of FIG. 34 shifted parallelly. The points 12A and 12B represent the lower end points of the virtual image 12. The projection optical system unit 19 is constructed in such a way that the bottom line L of the virtual image 12 is perpendicular to the forward direction of the car and that the display light h is projected at a desired angle.

Figure 36A:
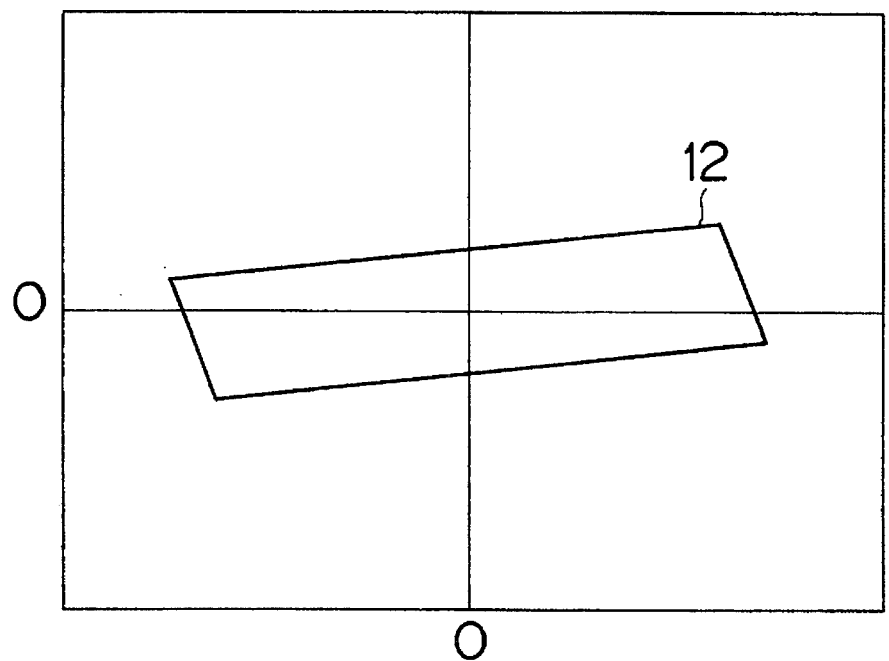
FIGS. 36a and 36b are diagrams showing the results of computer simulation of the virtual image as seen by the driver in the fourteenth embodiment.
Figure 36B:
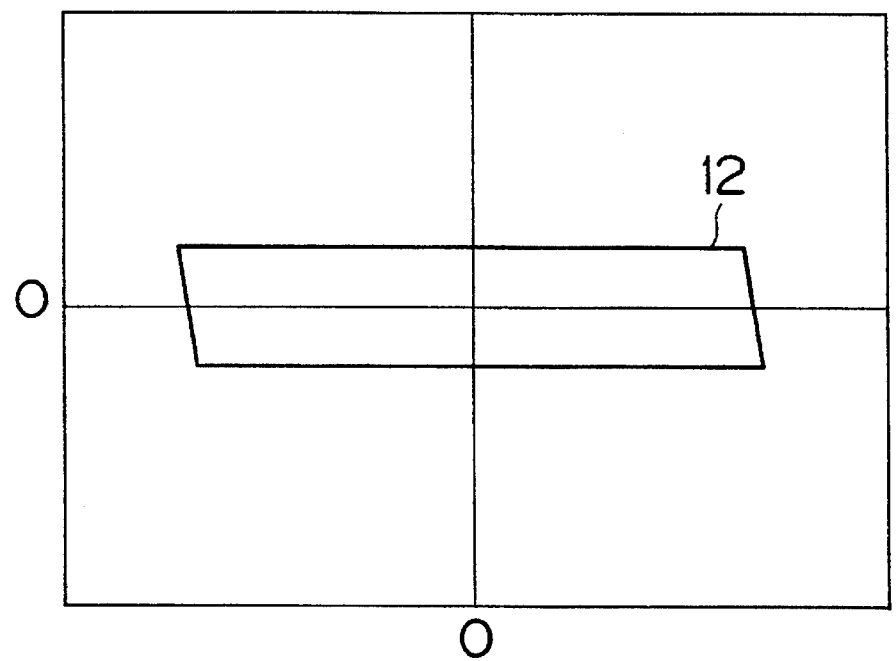

FIGS. 36a and 36b are the result of computer simulation showing virtual images as seen by the driver through the windshield. FIG. 36a shows the result of simulation of the virtual image with no image rotation compensation provided when the conventional projection optical system unit is mounted in the car. FIG. 36b is the result of simulation of the virtual image obtained when the projection optical system unit 19 of FIG. 34 is used. This embodiment can correct the image rotation.

In addition to the foregoing embodiments, the following headup display apparatuses applying this invention can be constructed.

As in the fifth and sixth embodiments, an optical system such as lens and concave mirror can be disposed between the indicator 1 and the off-axis reflective hologram 2 in the second to fourth embodiments to eliminate the chromatic aberration in the display.

It is also possible to apply to the seventh, eighth and fourteenth embodiment the enlargement optical system that is formed of a combination of lens or concave mirror and lens like those in the first to fourth embodiments.

The heat dissipating member 20 like the one used in the ninth embodiment, which is installed separate from the indicator and receives infrared rays to minimize the effects of heat from external light on the indicator, can be provided behind the off-axis reflective hologram or prism element in the first to eighth embodiment and the tenth to fourteenth embodiment.

Figure 37A:
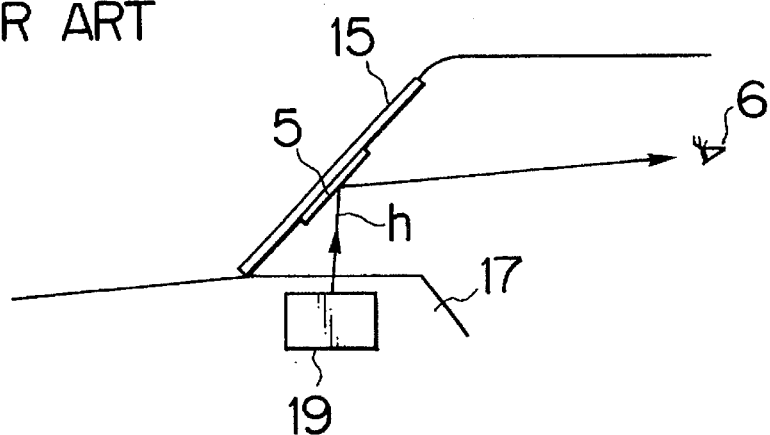
FIGS. 37a, 37b and 37c are three examples of conventional headup display apparatuses.
Figure 37B:
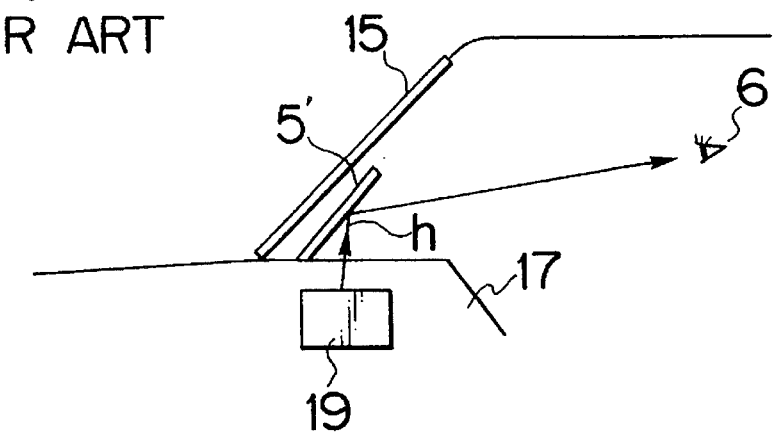
Figure 37C:
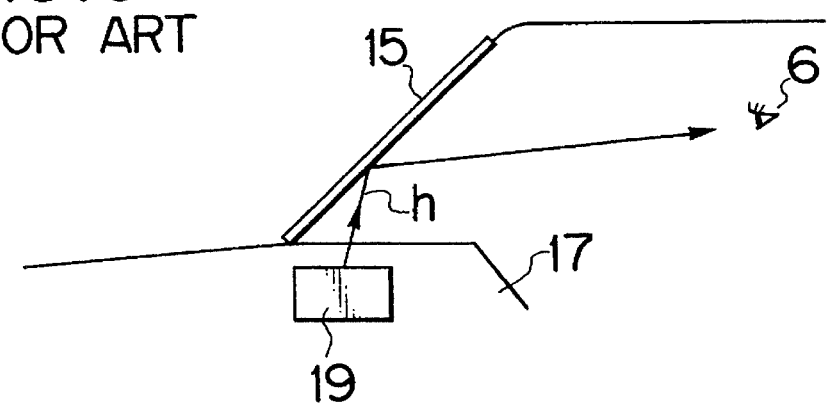

In the preceding embodiments, the windshield is used as a reflection member to reflect the display light toward the viewing point of the driver. It is possible to use as the reflection member a reflective hologram that is formed on the windshield as shown in FIG. 37a. It is also possible to use the combiner of FIG. 37b as the reflection member in the first to 13th embodiment.

Furthermore, in the first to 13th embodiments, it is possible to construct the optical system in such a way that the horizontal line of the virtual image is at right angles with the forward direction of the car, as with the virtual image 12 of the 14th embodiment, in order to reduce the window and therefore the amount of incident external light while at the same time compensating for the rotation of the display image caused by the windshield.

The construction and advantages of this invention may be summarized as follows.

The display light from the indicator is reflected in a predetermined direction by an off-axis reflection member such as an off-axis reflective hologram and prism element and then is further reflected by another reflection member such as the windshield toward the viewing point of the driver. The off-axis reflection member is so constructed that external light as from the sun coming in along the path of the display light in the reverse direction is reflected by the reflection surface of the off-axis reflective member in a direction different from that of the visible light of the indicator. This construction can reduce the intensity of that component of external incident light which enters the indicator, thus preventing the abnormal illumination of the indicator that would make the display image unrecognizable.

What is claimed is:

1. A headup display apparatus comprising:

an illuminating type indicator for emitting display light in a visible wavelength range;

a single off-axis reflective hologram for reflecting the display light from the indicator in a predetermined direction, said off-axis reflective hologram being fixed and non-pivoting and having a reflection surface that reflects incident external light coming in a direction reverse to the path of the display light toward a direction different from that of the visible display light of the indicator; and a reflection member arranged in a viewing field of a driver, said reflection member having an appropriate reflection factor, said reflection member reflecting the real display image from the off-axis reflective hologram toward the eye position of the driver so that a virtual image of the display formed by the display light reflected by the reflection member is superimposed on an exterior view seen through the reflection member, wherein said off-axis reflective hologram is disposed in close proximity to said illumination type indicator to eliminate chromatic aberration.

2. A headup display apparatus comprising:

an illuminating type indicator for emitting display light in a visible wavelength range;

a single off-axis reflective hologram for reflecting the display light from the indicator in a predetermined direction, said off-axis reflective hologram being fixed and non-pivoting and having a reflection surface that reflects incident external light coming in a direction reverse to the path of the display light toward a direction different from that of the visible display light of the indicator;

an optical system for forming a real image of the indicator on the off-axis reflective hologram to eliminate chromatic aberration; and a reflection member arranged in a viewing field of a driver, said reflection member having an appropriate reflection factor, said reflection member reflecting the display light from the off-axis reflective hologram toward the eye position of the driver so that a virtual image of the display formed by the display light reflected by the reflection member is superimposed on an exterior view seen through the reflection member.

3. A headup display apparatus comprising:

an illuminating type indicator for emitting display light in a visible wavelength range;

a single prism having a reflection film on a surface thereof on the opposite side of the indicator, said reflection film having a wavelength selectivity suitable for reflecting only the display light, another surface of said prism on the side of the indicator is formed as a surface for reflecting the display light from the indicator in a predetermined direction, said reflection surface of the prism being fixed and non-pivoting and reflecting incident external light coming in a direction reverse to the path of the display light toward a direction different from that of the visible display light of the indicator; and a reflection member arranged in a viewing field of a driver, said reflection member having an appropriate reflection factor, said reflection member reflecting the display light from the prism toward the eye position of the driver so that a virtual image of the display formed by the display light reflected by the reflection member is superimposed on an exterior view seen through the reflection member.

4. A headup display apparatus as claimed in any one of claims 1, 2 or 3, further comprising an enlargement optical system installed between said indicator and said reflection member.

5. A headup display apparatus as claimed in claim 4, wherein said enlargement optical system is a single concave mirror.

6. A headup display apparatus as claimed in claim 4, wherein said enlargement optical system comprises two concave mirrors combined.

7. A headup display apparatus as claimed in claim 4, wherein said enlargement optical system comprises a lens system.

8. A headup display apparatus as claimed in claim 4, wherein said enlargement optical system comprises at least one lens system and at least one concave mirror.

9. A headup display apparatus as claimed in claim 1, wherein a heat dissipating member is disposed behind and separate from said off-axis reflective hologram to receive infrared rays that have passed through said off-axis reflective hologram.

10. A headup display apparatus as claimed in any one of claims 1, 2 or 3, wherein said reflection member is a windshield of a vehicle.

11. A headup display apparatus as claimed in any one of claims 1, 2 or 3, wherein said reflection member is a reflection treatment member formed on the windshield of a vehicle to increase the reflection factor of the windshield.

12. A headup display apparatus as claimed in claim 11, wherein said reflection treatment member is a metal thin film.

13. A headup display apparatus as recited in claim 11, wherein said reflection treatment member is a dielectric multi-layer film.

14. A headup display apparatus as recited in claim 11, wherein said reflection treatment member is a regular reflective hologram film.

15. A headup display apparatus as claimed in any one of claims 1, 2 or 3, wherein said reflection member is a combiner disposed on the driver side of, but not on, the windshield of the vehicle.

16. A headup display apparatus as claimed in any one of claims 1, 2 or 3, wherein a virtual image of the display is formed to the left and in front of the driver in the case of a vehicle with a right-hand side steering wheel, and is formed to the right and in front of the driver in the case of a vehicle with a left-hand side steering wheel, and a horizontal line of the virtual image as seen by the driver is almost perpendicular to the forward direction of the vehicle and also virtually parallel with a horizontal plane of the vehicle.

17. A headup display apparatus as claimed in claim 3, wherein a heat dissipating member is disposed behind and separate from said prism to receive infrared rays that have passed through said prism.

\* \* \* \* \*